US006951516B1

(12) United States Patent
Eguchi et al.

(10) Patent No.: US 6,951,516 B1
(45) Date of Patent: Oct. 4, 2005

(54) METHOD AND APPARATUS FOR MULTI-USER COMMUNICATIONS USING DISCRETE VIDEO GAME PLATFORMS

(75) Inventors: Katsuya Eguchi, Kyoto (JP); Shigeru Miyamoto, Kyoto (JP); Takashi Tezuka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 99 days.

(21) Appl. No.: 10/217,140

(22) Filed: Aug. 13, 2002

Related U.S. Application Data

(60) Provisional application No. 60/313,470, filed on Aug. 21, 2001.

(51) Int. Cl.[7] .............................................. A63F 13/12
(52) U.S. Cl. ............................... 463/40; 463/1; 463/44
(58) Field of Search ................................. 463/40–44, 1

(56) References Cited

U.S. PATENT DOCUMENTS

| | | | |
|---|---|---|---|
| 4,445,187 A * | 4/1984 | Best .............................. | 463/31 |
| 4,570,930 A | 2/1986 | Matheson | |
| 5,083,800 A | 1/1992 | Lockton | |
| 5,149,104 A | 9/1992 | Edelstein | |
| 5,577,180 A | 11/1996 | Reed | |
| 5,807,173 A | 9/1998 | Aoyama | |
| 5,885,156 A * | 3/1999 | Toyohara et al. .............. | 463/1 |
| 5,961,385 A | 10/1999 | Aoyama et al. | |
| 5,964,660 A | 10/1999 | James et al. | |
| 5,984,783 A | 11/1999 | Kikuchi et al. | |
| 5,984,786 A | 11/1999 | Ehrman | |
| 5,993,319 A | 11/1999 | Aoyama | |
| 6,009,458 A | 12/1999 | Hawkins et al. | |
| 6,015,348 A | 1/2000 | Lambright et al. | |
| 6,024,643 A | 2/2000 | Begis | |
| 6,056,640 A | 5/2000 | Schaaij | |
| 6,106,395 A | 8/2000 | Begis | |
| 6,106,399 A | 8/2000 | Baker et al. | |
| 6,165,068 A | 12/2000 | Sonoda et al. | |
| 6,166,732 A | 12/2000 | Mitchell et al. | |
| 6,179,713 B1 | 1/2001 | James et al. | |
| 6,183,364 B1 | 2/2001 | Trovato | |
| 6,227,966 B1 * | 5/2001 | Yokoi ............................ | 463/1 |

(Continued)

OTHER PUBLICATIONS

Creatures, 1997, CyberLife Technology, Ltd., p. 19.*
Cheshire, Stuart, "An Experiment in Real-Time Networking for Computer Science Tripos Project Dissertation," Sydney Sussex College, submitted May 19, 1989.

(Continued)

*Primary Examiner*—Scott E. Jones
(74) *Attorney, Agent, or Firm*—Nixon & Vanderhye P.C.

(57) ABSTRACT

A multi-user video game with communications capabilities allows players to communicate with one another via simulated mail, leaflets and conversations. Different installations of the game on different discrete video game playing platforms may be unique or different depending upon random or other data available at the platform. For example, different installations may have different subsets of characters, different landscapes, or the like. Player characters from one virtual environment or village may visit another virtual environment or village and return home to his or her resident environment or village. Non-player characters may move from one virtual environment or village to another—thereby providing an ever-changing variety of characters. Communications between different game playing platforms can be provided via portable memory devices, portable game playing devices, or conventional communications means such as networks.

19 Claims, 31 Drawing Sheets

U.S. PATENT DOCUMENTS 6,253,167 B1    6/2001   Matsuda et al.
6,267,677 B1 *  7/2001   Tajiri et al. .................... 463/43
6,306,039 B1 * 10/2001   Kaji et al. ..................... 463/42
6,447,396 B1 *  9/2002   Galyean et al. ............... 463/40

OTHER PUBLICATIONS

Nintendo Game Boy Pokémon Blue Version game cartridge, (1995, 1996, 1998).

Pokémon Trainer's Guide (1995, 1996, 1998).

Sneakernet, www.computerhope.com/jargon/s/sneaker.htm (printed Nov. 22, 2004).

Sneaker Net, http://c2.com/cgi/wiki?SneakerNet (Sep. 20, 2004).

Bailey, Charles W. Jr., "The Coalition for Networked Information's Acquisition-on-Demand Model: An Exploration and Critique," http://info.lib.uh.edu/cwb/cni/htm, print version, *Serials Review* 18, Nos. 1-2, 78-81 (1992).

* cited by examiner

Example Data Structures

Example Player Data Access

Fig. 8
Example Stored Data Access

Contents of flash ROM

- FR
- 302 — Field FG data
- B(1) — Living animals 15. Each animal has various flags and memory information for seven players
- 304
- 308 — Four players. Each player maintains various information and home data
- 310 — Stock of moving animal Topographic and FG data developed to field — 202
Various animal information — 204

When going out of village, data are stored at the station
- 312 — Player data (except home data)
- 314 — Moving Animal
- 316 — Save data of letter Stored at Post Office

Players come from other village go into this village through the station
- 312 — Player data (except home data)
- 314 — Moving Animal
- 316 — Save data of letter Stored at Post Office Example Player Moving Example Player Moving Example Player Moving

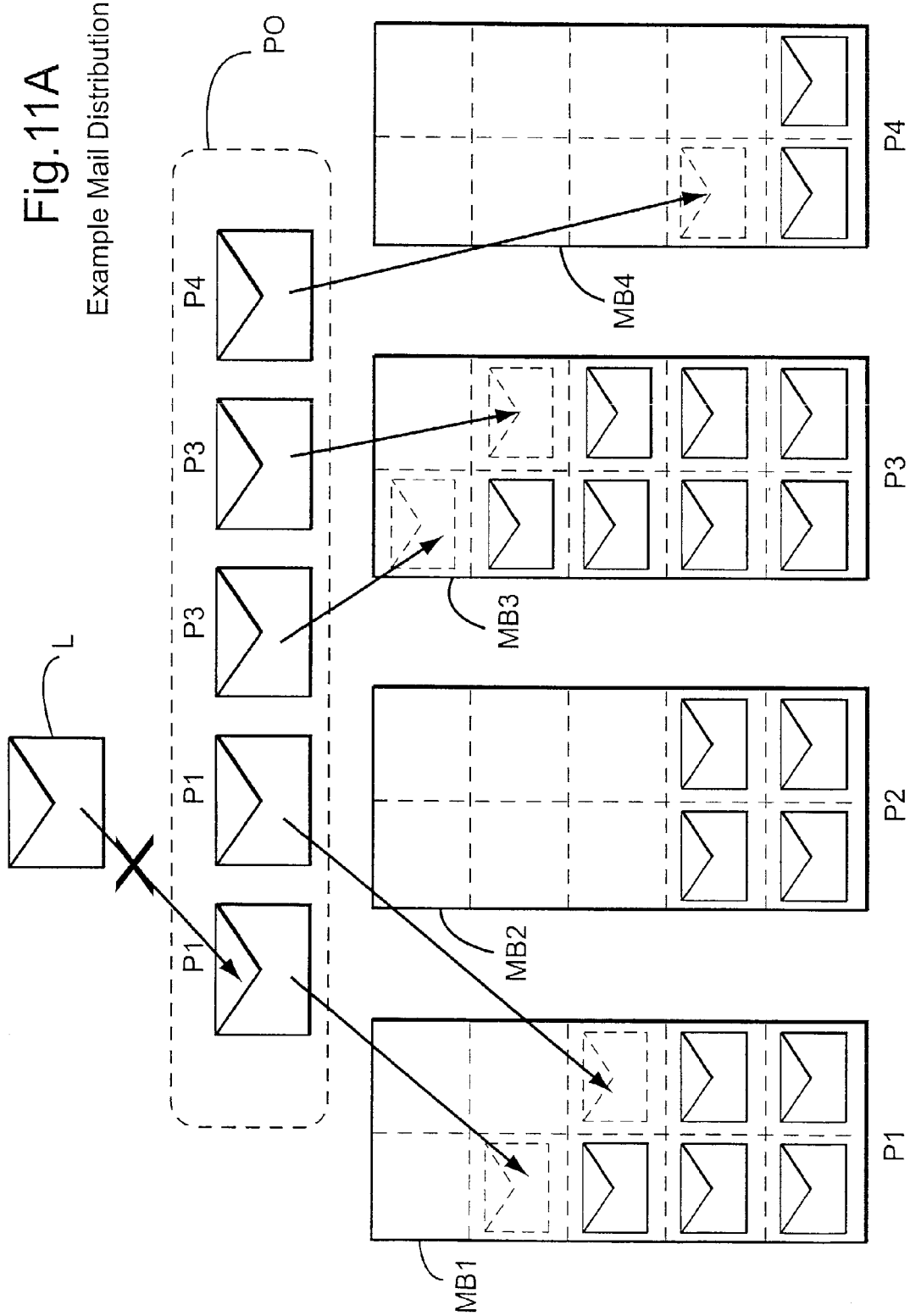

Example Mail Distribution

Example Leaflet Delivery

Example Mail Delivery

Example Bulletin Board

Example Main Game Flowchart

Example Main Game Flowchart

Example Main Game Flowchart

Example Main Game Flowchart

Example Main Game Flowchart

Example Main Game Flowchart

Example Game End Routine

Example Game End Routine

Example Game End Routine

Example Game End Routine

Example Animal Moving Routine

Example Animal Moving Routine

Example Home Data Save Routine

Example Home Data Save Routine

Example Home Data Save Routine

METHOD AND APPARATUS FOR MULTI-USER COMMUNICATIONS USING DISCRETE VIDEO GAME PLATFORMS

CROSS-REFERENCES TO RELATED APPLICATIONS

Priority is claimed from application No. 60/313,470 filed Aug. 21, 2001, which is incorporated herein by reference.

STATEMENT REGARDING FEDERALLY SPONSORED RESEARCH OR DEVELOPMENT

Not applicable.

FIELD OF THE INVENTION

This invention relates to video and computer games, and more particularly, to role playing games in which a player can interact with a virtual environment and/or other players. This invention also relates to so-called multi-user dialog ("MUD") role playing games.

BACKGROUND AND SUMMARY OF THE INVENTION

Multi-user dialog ("MUD") role playing games have become quite popular within the last few years. Briefly, a multi-user dialog game uses a computer to create a virtual environment such as, for example, a medieval town, a castle, or any other natural or manmade landscape. Players participate in the game by assigning themselves characters sometimes called avatars. Generally, an avatar is a character within the game that the player defines and uses as his or her alter ego to interact with the game. For example, in a medieval town, one player might define his character to be a wizard, another player might create her character as a queen and still another player might decide to define herself in the game through a character in the form of a shop keeper. By interacting with the game through a display and a user input device, each player can control his or her own character to travel through the game's virtual environment and interact with that environment and with other characters.

Generally in such games, a central game server computer keeps track of each character's location in the environment and the characteristics of each character. This central server also provides tools (e.g., communications dialog capabilities and other interaction capabilities such as for example "fight"). The ability of having one's character interact with another player's character through the game medium can add a great deal of interest to the play of the game.

Commonly, such multi-user dialog role playing games are played in a computer network that allows for real time interaction among a number of players simultaneously. For example, perhaps the most common and widely used form of multi-user dialog game currently runs on a server connected to the Internet. Each participant connects to the MUD server via an Internet connection to his or her own personal computer or other computing device. The MUD server allows a number of different players to connect simultaneously—allowing simultaneous real time interaction between players through their respective characters. Players may thus communicate, cooperate and befriend one another in real time through their respective characters.

Such multi-user dialog role playing games have achieved a high degree of sophistication and popularity in the networked computer world, but have not been successfully implemented before in a non-networked computing platform context such as home video game systems. While the idea of a network of home video game systems is known and some home video game companies have attempted networking, most home video game systems in use today are not networked or otherwise connected to any other computer or other video game system. Often, people place their home video game systems in a living room or den where there is no dial-up telephone line that could be used to connect the home video game system to a network. Additionally, accessories that might have been available in the past for establishing a home video game system network connection tended to be expensive, and often required a level of technical proficiency beyond at least younger game players. Furthermore, the business models associated with previous attempts to network video game systems tended to be based on monthly subscription fees that many people were unwilling to pay. For these and other reasons, the realization of a large scale network of home video game systems has not yet materialized.

As hardware accessories become less expensive, data bandwidth into the home becomes more available, and compelling video game content requiring a networked connection provides enough added value to justify the cost, there will certainly come a time when home video game systems will be networked in the same way that most home personal computers now have some access to the Internet or other computer networking services (e.g., America Online, CompuServe, etc.). However, despite major pushes by certain video game platform companies (e.g., Sega) encouraging home video game networking, it appears that nearly universal home video game platform networks may still be a few years away.

Before as well as after the widespread acceptance of home video game networking, it would be highly desirable to provide multi-user dialog video games playable on home video game platform environments. The present invention provides a solution by, among other things, providing a multi-user role playing game that can be run on a community of discrete stand-alone home video game platforms capable of intermittently exchanging small amounts of data—and which takes advantage of the discrete, self-sufficient functionality of home video game platforms to provide a fun, interesting and exciting game play.

In accordance with one aspect provided by this invention, virtual game playing environments are defined on each of a collection or community of home video game systems. For example, in one preferred embodiment, random data available at each of the home video game systems is used to uniquely define respective virtual game playing environments. Thus, a person can have an enjoyable game playing experience using his or her own home video game system by, for example, providing user input through a user input device and watching a display on a home color television set.

In accordance with an aspect of a preferred embodiment of this invention, characters defined within one virtual game environment can "visit" or move permanently to another virtual game environment. For example, a particular game play character defined within the virtual game environment at my house may decide to leave my virtual game environment and move to the virtual game environment defined at your house. Similarly, a game playing character within your virtual game playing environment may be able to come visit my virtual game environment and then return home to your virtual game environment.

In the exemplary embodiment, the sharing or transferring of characters, objects or other aspects of unique virtual game environments defined on a corresponding collection of home video game platforms is accomplished through intermittent exchange of data between the respective home video game platforms. Such intermittent data exchange can be provided, for example, by removing a portable memory device containing the data to be exchanged from one home video game platform, physically transporting the portable memory device to another home video game platform, and connecting that portable memory device so that it can be read by the other home video game platform.

For example, suppose a player wishes to have his character visit the virtual game environment defined at the home video game platform of a friend. In such instance in the exemplary and illustrative embodiment, the player may command his or her home video game platform to store data defining his or her corresponding character on a portable memory device connected to is or her home video game platform. The player's character thus "leaves" his "home" virtual gaming environment to go abroad and visit another virtual gaming environment. The player may then remove the portable memory device from his or her home video game platform and physically carry it to a friend's house. Upon arriving at the friend's house, the player may insert the portable memory device into the friend's home video game platform and thereby enter the virtual game environment defined there. The player may interact with the friend's virtual game environment, meeting characters there, collecting objects and gathering experiences.

When game play at the friend's house is concluded, the player may save his character's data back to the portable memory device. The new objects, experiences and other information acquired in the friend's virtual game environment may be similarly stored on the portable memory device. When the player returns home, he may insert the portable memory device back into his or her own video game platform, and his or her character may thereby "return home" to the player's own virtual game environment—while still maintaining the benefit of the objects and experiences when abroad.

Thus, one aspect of the preferred embodiment of the present invention is to provide an ability for player-defined role playing characters to travel between unique or different instances of an overall role playing video game environment at respective home video game or other game playing devices.

In more detail, in accordance with one aspect provided by an example embodiment of this invention, a player interacts with his or her own video game platform to define a player character (e.g., an animal in the forest, a medieval knight, or any other type of character appropriate to the particular type of game environment). The home video game platform stores information defining this player character within a writable storage device that is local to the home video game platform. For example, this information may be stored within a "flash," magnetic or other memory.

After playing the game and storing character-related data on the memory, the player may remove the memory from his or her own video game system and take it to the house of a friend who has a similar home video game system. The removable, portable memory may now be connected to the friend's home video game system—thus introducing the first player's character into the virtual environment defined on the friend's home video game system. In this way, player characters can move between different, discrete instantiations of a common virtual environment defined by the multi-user dialog game.

The different instantiations of the virtual game playing environment are, in accordance with another aspect provided by this invention, not identical. For example, the virtual environment defined by the overall multi-user dialog game may be a large place (e.g., a forest, a galaxy, a mythical or actual country, etc.) having a number of smaller subdivisions (e.g., villages or other communities, inhabitable planets, castles, etc.) within it. Each instance of the game may define a different subdivision. As one example, the instantiation of the game at a first player's home video game platform may define a first village within a forest, and the instantiation of the game at another home video game platform may define a different village within the forest. A player may visit another village by going over to a friend's house—thereby transporting his or own character to visit the virtual village defined in the friend's home video game platform—and thereafter return home to his own "home" village.

In accordance with yet another aspect provided by an example embodiment of this invention, information other than that representing player characters can be shared between different instantiations of the game. For example, characters associated with players may interact with other characters that are controlled by the game itself. Different instantiations of the game can define different "non-player" characters. These non-player characters can be shared between game instantiations. Thus, for example, when a player transports a portable data storage device to another player's house, he or she may be introducing interesting non-player characters into the friend's instantiation of the game—providing new characters for the friend's character to interact with. Non-player characters may thus travel from one instantiation of the game to another—increasing the interest level among all of the game players.

The data transport mechanism may also be used to communicate objects between different game instantiations. For example, in accordance with another aspect provided by a preferred embodiment of this invention, mail or other messages can be sent between different instantiations of the game. This allows players using one instantiation of the game to communicate with players using another instantiation of the game. Objects other than mail (e.g., goods to purchase, magic charms, regional food items, etc.) may also be communicated between game instantiations to maintain a high level of interest, variety and fun.

Other illustrative and exemplary features and advantages provided in accordance with further aspects of preferred illustrative embodiments of this invention include:

Each game instantiation or installation defines a unique virtual environment, and residents randomly or otherwise set up the unique environment as a personalized unique world.

The passage of time in the game and the passage of time in real life may be synchronized. Thus, as time passes in real life, the game environment may respond by changing the seasons, causing plants and trees to grow, etc.

A record of a village or other virtual environment instantiation may be shared and played by more than one player.

A letter may be written to other players. Upon request at a post office, the letter can be delivered to other players' mailbox at a predetermined delivery time. This modeling of a postal system provides communication between players who are not playing the game simultaneously.

Each instantiation of the virtual environment may provide a bulletin board or other centralized place for posting messages that other players may read. This mechanism can provide inter-player communication for players who are not simultaneously playing the game.

A player "registered" in one game instantiation or installation can visit another game instantiation or installation.

Non-player characters can remember multiple (former) players who are not currently playing. Thus, a non-player character may talk about players who are not currently playing—providing an interesting historical aspect and allowing one player to learn about another player through non-player characters.

A non-player character defined in one virtual game environment instantiation can move to another virtual game environment instantiation. The historical recollection of a non-player character can move with the characters, so the non-player character can "remember" the players and other aspects of the original game environment after the non-player character has moved to a new environment. For example, a non-player character who has moved from one village to another can relate, to the player characters in the new village, the players the non-player character interacted with while in the former village as well as other aspects of the former village.

A game player can be asked to deliver things from one non-player character to another. This delivery is possible even after the non-player character has moved to another instantiation of the game. Thus, for example, a player may be given a quest to deliver a particular object to a non-player character in another instantiation of the game. This requires the player to visit a friend's house. In this way, it is possible to request and achieve quests for other objectives involving multiple installations of the game.

A player can compose music for his or her own instantiation of the game. For example, the player can compose a village melody used to report the time or to make other special effect sound.

Player characters in the game can communicate using dialects or other particular manners of speaking. Thus, player and non-player characters may communicate using individual, unique speech characteristics. It is possible for a particular manner of speaking to grow into popularity among other players. For example, a particular dialect or set of expressions may become popular in one instantiation of the virtual game environment as a particular player interacts with that environment. Such particular ways of speaking may become popular in other instantiations as game data moves from one instantiation to another. This feature is not limited to manners of speaking, but can be extended to other aspects of behavior such as particular practices, types of work or play, favorite foods, etc. This feature can be used to provide additional variety as well as to simulate how fads and other behavior may be shared and become popular in different regions of a virtual world.

The invention is not limited to data exchanges using portable, removable physical storage media. For example, it is possible for a player to use electronic mail or any other communications mechanisms (including the Internet) to "network" or otherwise transfer data from one instantiation of the game to another.

A player or non-player character may be defined using a texture or other graphical content designed by the player. For example, the player may define a particular graphic to be used to pattern the clothing, umbrella, or other articles of his or her avatar. This technique can also be used by a player to customize his or own instantiation of virtual game environment (e.g., to hang a favorite picture on the wall). Different graphical contents can be traded between players.

A portable game platform can be used to further increase functionality and to transport game data from one game instantiation to another. For example, a player may connect his or her own video game platform to a portable game device and download data into the portable game device. The portable game device may or may not provide a limited degree of game playing capability using this data. The player may transport the portable game device to another player's house and connect it to his or her home video game platform—therefore sharing and exchanging data between the two home video game platforms via the portable game playing device.

BRIEF DESCRIPTION OF THE DRAWINGS

These and other features and advantages provided in accordance with exemplary and illustrative embodiments of the present invention may be better and more completely understood by referring to the following detailed description in conjunction with drawings, of which:

FIGS. 3A–3E show one example, illustrative mechanism for sharing data between different instances of a role playing video game;

FIG. 8 shows an example access of stored data;

FIGS. 1A–11B show example game mail distribution;

DETAILED DESCRIPTION OF PRESENTLY PREFERRED EXAMPLE EMBODIMENTS

Figure 1:
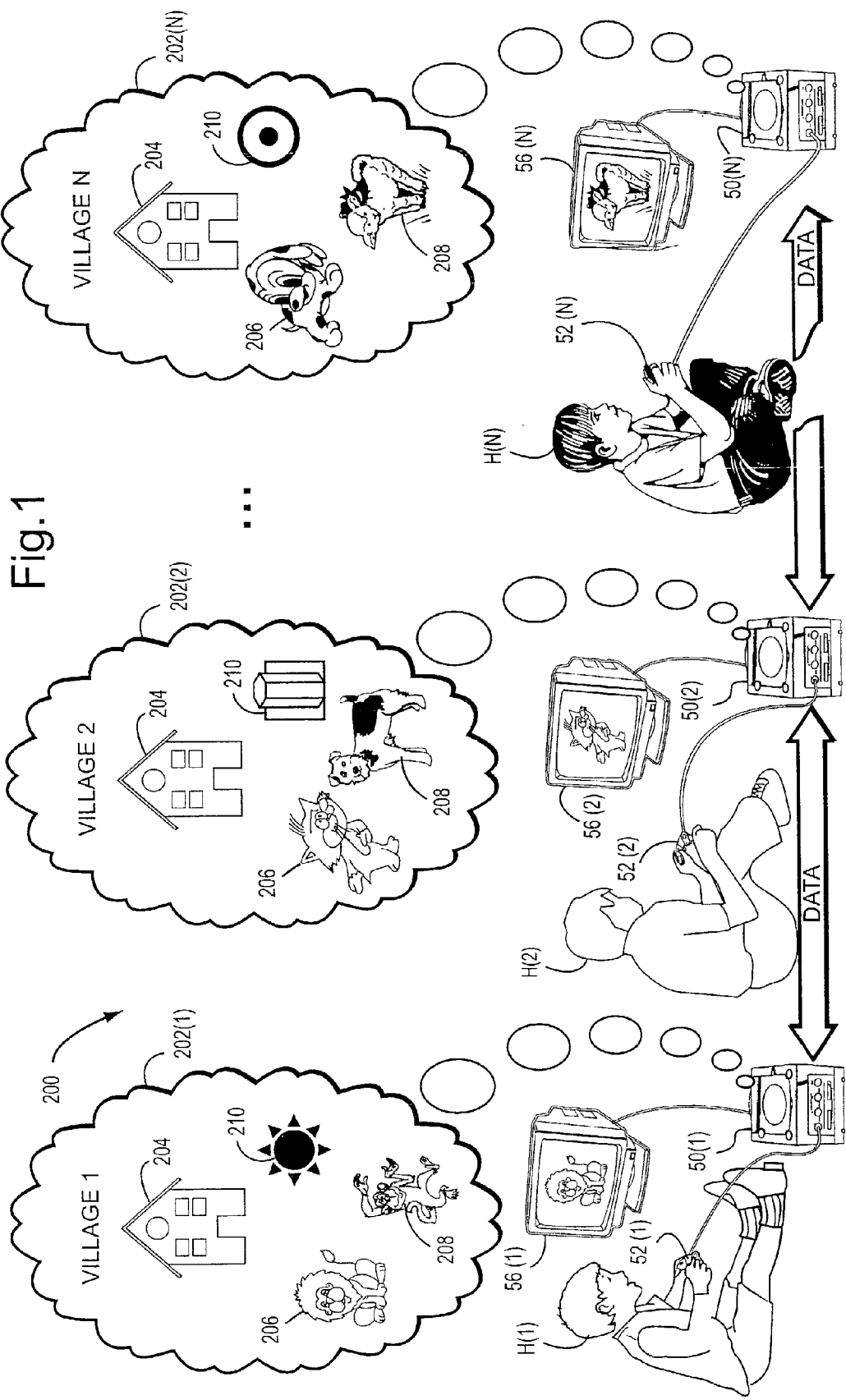
FIG. 1 is an overall schematic illustration of one illustrative preferred embodiment of the invention.

FIG. 1 shows an example illustrative embodiment of a multi-user dialog gaming environment 100 defined by a plurality of home video game platforms 50. In the example embodiment, each home vide game platform 50 includes a main unit that is connected to a suitable display 56 such as a home color television set and is also connected to a user input device such as for example a handheld controller 52. In the example illustrative embodiment shown, players interact with each of the home video game platforms 50 by operating controls on handheld controller 52 to cause an interactive real-time video game to be displayed on display 56. In an illustrative embodiment, each of handheld video game platforms 50 is programmed using a replaceable mass storage device such as for example an optical disk 62 storing executable video game software. This video game software programs the various video game platforms 50 to play particular video games.

In the example illustrative embodiment, each of the discrete video game platforms 50 is programmed to play the same overall multi-user dialog role-playing video game. In more detail, in an example embodiment, each of the players H purchases or otherwise obtains an optical disk or other mass storage device 62 (not shown in FIG. 1) that contains the particular role-playing game, and inserts this mass storage device into his or her home video game platform 50 in order to play the role playing game. In accordance with one aspect of the illustrative preferred embodiment, random or other data (e.g., based upon a real-time clock, exact delay time between operations of the handheld controller 52, or the like) available at the home video game platform is used by the role-playing video game to set up and define a local virtual environment 202. For example, random data available at setup time at home video game platform 50(1) is used to set up a virtual environment 202(1) associated, for example, with a village defined within a virtual country, forest or world. This village virtual environment 202(1) may have a number of dwelling places 204, player characters 206, non-player characters 208, and objects 210 defined within it. Because these various dwelling places, characters 206, 208 and objects 210 are defined in part by data or information supplied by the system 50, the virtual environment 202(1) will be unique to the specific home video game platform 50(1) and associated player H(1). Similarly, different virtual environments 202(2), 202(N) may be defined by any number of additional home video game platforms 50(2), . . . 0.50(N) and associated players H(2), . . . H(N).

In the example, illustrative embodiment, each home video game platform 50 is capable of playing a role playing game within the corresponding virtual environment the home video game platform sets up and defines. Thus, in a single or multi-player mode, each home video game platform 50 allows its corresponding player(s) H interact with a corresponding virtual world 202. For example, the player H can define his or her own personalized alter ego ("avatar") player character 206. This player character 206 can have particular personality, appearance and other characteristics that are defined and specified by the player H. The player H can, for example, customize the appearance of the player character 206 by importing and defining graphics used for the player character's clothing or accessories.

Once the player H has defined a corresponding player character 206, the player may control his or her player character 206 to move through and explore the virtual environment 202. In the course of moving through and exploring the virtual environment, the player character 206 may meet other characters such as, for example, non-player characters 208 defined by the game. The player character 206 may communicate with the non-player characters 208 and carry on conversations with them. The player character 206 may also customize his or her dwelling 204, gather objects 210, and do a variety of other activities (e.g., fishing, gathering food, hunting, writing songs, stories or poetry, or the like). In the example embodiment, all of these activities are simulated and controlled locally by the player H's own local home video game platform 50.

The home video game platform 50 may make use of local, non-volatile writable storage (e.g., flash memory within a video game or other memory cartridge, battery-backed random access memory within a memory expansion port, mass storage within a writable mass storage device, etc.) to store the various parameters developed during game play between one game play session and another. In this way, the player H can play the role playing game on a succession of different days over the course of weeks or months. Each time the game is started, it recalls previously stored data to maintain a historical record of the player H's prior game playing experiences (e.g., objectives accomplished, objectives lost, interactions with other characters, objects located, etc.).

In accordance with one aspect provided by the illustrative embodiment, non-player characters 208 "remember" their interactions with player characters 206. For example, suppose that during a particular game playing session, player character 206 had a conversation with non-player character 208 about a particular subject. In the illustrative embodiment, the non-player character will remember some aspect of this conversation (this is accomplished by home video game platform 50 recording, in writable non-volatile memory, the content of the conversation and other events surrounding it). During a subsequent game playing session that may be weeks or months later, when the player character 206 again meets the non-player character 208, the non-player character may recall and discuss the previous conversation it had with the player character. This provides a high degree of realism and authenticity and makes the game playing experience more enjoyable.

In the illustrative embodiment, the passage of time within virtual game environment 202 is synchronized (via a real-time clock operating within home video game platform 50 and or by other means) to the actual time, day and date within the real world. Thus, for example, if player H plays the role playing game in the winter months, the landscape within virtual environment 202 might be snow covered or decorated with Christmas lights. If the player H plays the role playing game in the summer months, the virtual game environment 202 may simulate heat and growing plants and vegetables. Similarly, if the player H plays the role playing game in the Fall, the game may simulate Fall by having the trees within the virtual environment 202 change colors and make the weather colder.

While in the example embodiment each home video game platform 50 is capable of playing the illustrative role playing game in an entirely stand-alone mode without communicating any data to any other home video game platform, game play is made more interesting, varied and fun by providing data communications capabilities allowing different home video game platforms 50 to communicate data with one another concerning the role playing game. In the exemplary illustrative embodiment, home video game platforms 50 may be but are not necessarily "networked" together in the traditional sense. In particular, in one illustrative example, home video game platforms 50 are not connected to any interactive network such as the Internet, nor do they need to be so connected in order to play the role playing game provided by the exemplary embodiment. While the role playing game could make use of conventional network connections, such network connectability is not required in order to play the illustrative role playing game described herein.

In more detail, the exchange of a limited amount of data between the various portable home video game platforms 50 may be used to permit virtual characters and/or objects to travel between the associated virtual game environments 202. For example, it is possible for a player character 206 originating in the virtual game environment 202(1) defined by home video game platform 50(1) to travel to and visit the virtual game environment 202(2) defined by another home video game platform 50(2). Since the virtual game environment 202(2) set up by home video game platform 50(2) is different from the virtual game environment set up by home video game platform 50(1), allowing player H(1) and his associated player character 206 to visit the other virtual game environment 202(2) will be very interesting. The player H(1) will have become familiar with his own virtual game environment 202(1), so visiting a different virtual game environment will be fun. Moreover, the player H(1) through his player character 206 may have been searching for a number of different objects or meet a number of non-player characters 208 in order to fulfill certain objectives or quests, but may have been unable to locate certain such objects or characters because they do not exist in his own associated virtual game environment. However, such objects or characters may be found in a different virtual game environment 202(2). In accordance with the illustrative embodiment, the player character 206 may bring objects 210 with him or her when he visits a different virtual game environment 202(2), and similarly may bring objects from the other virtual game environment (and a record of characters he or she met there) back with him or her to the home virtual game environment 202(1).

In accordance with a further aspect of the illustrative embodiment, non-player characters 208 may also move between virtual game environments 202. For example, a particular non-player character 208 originally inhabiting virtual game environment 202(1) and having experienced events and met player characters 206 within that virtual game environment may move to a different virtual game environment 202(2). For example, there may be hundreds of different non-player characters 208 that the role-playing video game can support and define. However, in one exemplary embodiment, only a small subset of those non-player characters 208 (e.g., on the order of a dozen or so) may inhabit or reside in any given virtual game environment instance 202. This means that different virtual game environment instances 202 will be inhabited by different non-player characters 208—making a visit to a different virtual game environment that much more interesting. However, to further increase the interest level, non-player characters 208 can move from one virtual game environment instance 202 to another in the preferred, exemplary embodiment. Generally, the preferred exemplary embodiment causes the non-player characters 208 to trade locations (i.e., when one non-player character moves out of a particular virtual game environment instance 202, another moves in in its place). However, in certain circumstances in the preferred exemplary embodiment, it is possible for one non-player character 208 to move in without replacing another non-player character (e.g., if there are already too few non-player characters within the particular virtual game environment instance 202). In any event, a constantly changing cast of non-player characters 208 increases the level of interest of game play, and also encourages players to establish an ever-widening network of friends who are playing the game. This effect further increases the level of interest and excitement, and also encourages increased sales of the game as more people become interested in participating.

In the example embodiment, a non-player character 208 may move from one virtual game environment instance 202 to another while retaining its memories of the original game environment. The non-player character 208 once it is moved to the new virtual game environment 202(2) may, for example, have conversations with player characters 206 in the new virtual game environment about its experiences and the player characters 206 it met in the virtual game environment(s) 202(1) it formerly resided in. This provides a high degree of real life simulation and realism, and also adds a substantial amount of interest to the game play.

In accordance with yet a further aspect of the illustrative embodiment, mail can be sent between virtual game environments 202 in order to permit a player character 206 in one virtual game environment to communicate with a player character in another virtual game environment 202(2). One illustrative embodiment supports only a single player at a time at each home video game platform 50, so such recorded communication between players H can be important in allowing players to coordinate efforts with one another as well as to exchange information about the game play or other matters.

As shown in FIG. 1, any number of virtual game environments 202(1), 202(2), . . . 0.202(N) can be established using associated home video game platforms 50(1), 50(2), . . . 50(N). Each individual virtual game environment 202 can be unique, but they are all compatible with one another in the sense that it is possible to exchange data between them to provide certain types of sharing or transfer or virtual game environment characteristics from one environment instance to another. Increased numbers of instances of virtual game environments 202 may provide an increased level of interest and excitement in the game play because of the increased possibilities of sharing different non-player characters 208 between the various environments. For example, each individual virtual game environment 202 may have only a certain number of non-player characters out of a much wider assortment of possible characters—but different instances of the virtual game environment 202 will have different active subsets of non-player characters. Therefore, an increased total number of virtual game environments 202 that are being used to share data means an increased overall variety of total active non-player characters 208 within an associated community of players H.

EXAMPLE ILLUSTRATIVE TECHNIQUES FOR
EXCHANGING DATA BETWEEN HOME
VIDEO GAME PLATFORMS 50 AND
ASSOCIATED VIRTUAL GAME
ENVIRONMENTS

As explained above, it is helpful to the operation of the exemplary preferred embodiment of the present invention that the various home video game platforms 50 be networked together in the sense that they are able to exchange and communicate data to one another. It is not necessary or essential to the preferred exemplary illustrative embodiment that any sort of a networked, central game server be provided to control the operations of the various home video game platforms 50. Rather, in the illustrative embodiment, game play is distributed throughout a collection of stand-alone, essentially autonomous home video game platforms 50 each of which is able to play the role play game independently without requiring any input or other data from any other home video game platform or other source. However, as discussed above, game play becomes much more varied and interesting if it is possible to exchange data between the various home video game platforms 50, since this allows characters, objects, mail, and other information to pass between the different instances of virtual game environment 202.

Figure 2:
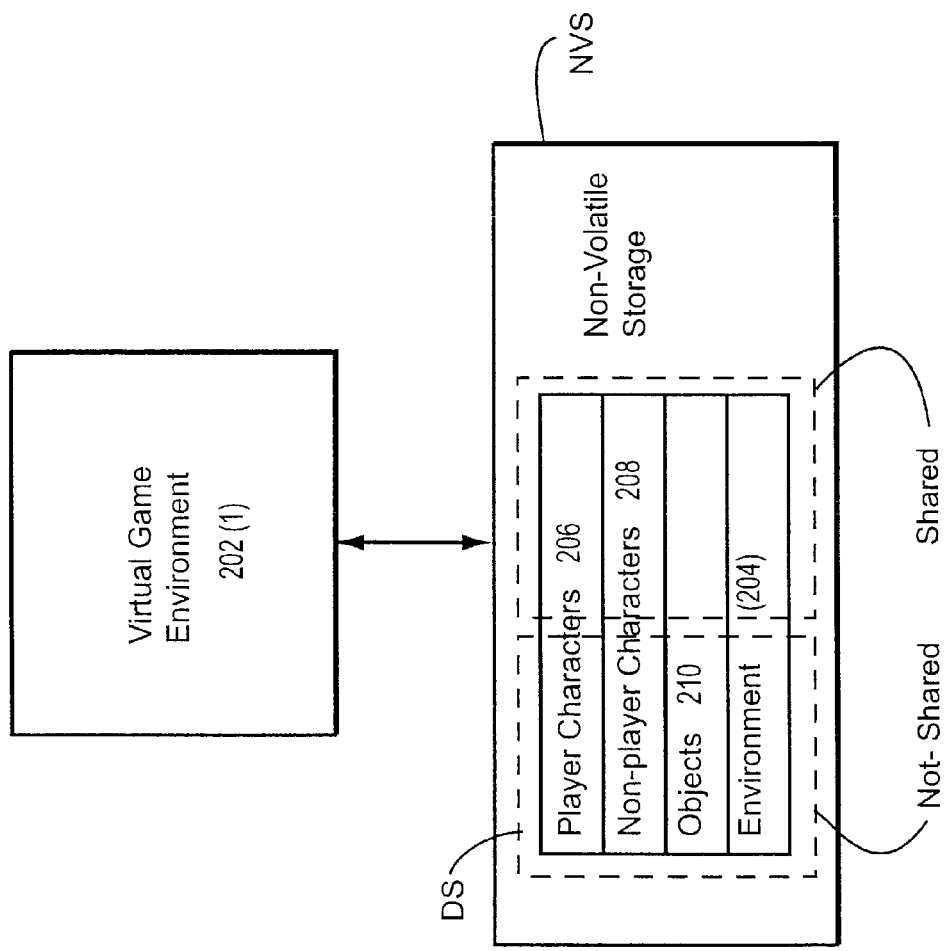
FIG. 2 is a schematic diagram illustrating data storage.

Generally, each home video game platform 50 in the exemplary illustrative embodiment includes some amount of writable storage capability. This writable storage capability is used to provide a "memory" for the virtual game environments 202 set up by execution of the role-playing game on the various home video platforms 50. Such non-volatile memory recording the game environment 202 parameters, the characteristics of the player characters 206, the personalization of the environment and associated dwellings 204, the set of non-player characters 208 and objects 210 defined within that particular instance of the virtual game environment, and the history and experiences of the various characters 206, 208 are preferably stored at the end of (or during) each game play session in non-volatile storage NVS (see FIG. 2) so they are available during the next game play session. This non-volatile storage NVS contents is also used to maintain the customization and uniqueness of a given virtual game environment 202.

In the example embodiment, some subset of the data within the non-volatile storage NVS associated with one instance of virtual game environment 202 may be exchanged (i.e., shared or transferred) with another virtual game environment. If the entire non-volatile storage NVS contents associated with one virtual game environment 202(1) were transferred and used by another virtual game environment 202(2), that other virtual game environment 202(2) might lose its uniqueness (as would the original virtual game environment 292(1)) because the states of the two virtual game environments could become identical. Therefore, in accordance with an aspect provided by the illustrative embodiment of this invention, some of the non-volatile storage NVS contents are not transferred between virtual game environments 202. Rather, only a subset of the non-volatile storage NVS contents is exchanged or transferred between virtual game environments 202.

In accordance with a further aspect provided by an illustrative embodiment, some subset of data within non-volatile storage NVS may be transferred permanently to another virtual game environment 202 and deleted from the NVS associated with the original virtual game environment. Other data is shared only temporarily. Still other data is not shared but remains within the originating virtual game environment. Such different techniques for sharing, exchanging and/or transferring data are used to allow player characters 206 to temporarily visit other virtual game environment instances 202 and subsequently return "home" to their own virtual game environment while allowing certain non-player characters 208, objects 210, and letters or mail to be transferred between virtual game environments so that they start out in one virtual game environment and move to another virtual game embodiment without being both virtual game environments simultaneously.

The particular mechanism used to provide data communications between different video game platforms 50 and associated virtual game environments 202 depends on the storage and other capabilities of the particular video game platforms 50. For example, one type of commonly known video game platform stores video game programs within portable, interchangeable video game cartridges. Such cartridges typically include read-only memory for storing video game software, and also include read/write semiconductor memory (e.g., so-called "flash" random access memory, electrically erasable programmable read only memory, etc.) allowing data to be written into the game cartridge and stored there in non-volatile form for later retrieval. Such video game platforms may also include additional non-volatile storage in the form of, for example, an expansion memory module that can be plugged into the handheld controller 52 or other port on the video game platform 50. Such a memory storage architecture can be used to facilitate exchange of data between virtual game environment instances 202 in the preferred exemplary embodiment. As one example, the video game cartridge including its associated internal flash memory might define an associated instance of a virtual game environment 202, but might not necessarily be used for sharing data between virtual game environment instances 202. In such an architecture, portable non-volatile memory modules that are plugged into handheld controllers 52 or other ports on the home video game platform 50 might be used to store data to be exchanged or shared with another virtual game environment instance 202. In such an exemplary arrangement, data can be shared between home video game platforms 50 and associated virtual game environment instances 202 by a player H physically carrying a portable non-volatile memory from one video game platform 50 to another and coupling the non-volatile storage to the other home video game platform in order to share the data with it.

Other home video game platform 50 configurations may provide portable semiconductor writable memory devices such as, for example, memory cartridges, memory cards, or memory strips that can be used to transfer data between home video game platforms. In still other home video game platform 50 configurations, magnetic disk, magnetic tape, magnetic stripe or other portable writable memory may be available to read data from and write data to. In still other home video game platform 50 configurations, it may be possible to transfer a limited amount of data from one home video game platform to another manually (e.g., by displaying codes on the display 56 of the originating home video game platform and manually inputting these codes into the receiving home video game platform. In still other configurations, writable optical disks or other types of optical memories may be used to transfer data. The present invention is intended to cover all such variations.

Figure 3:
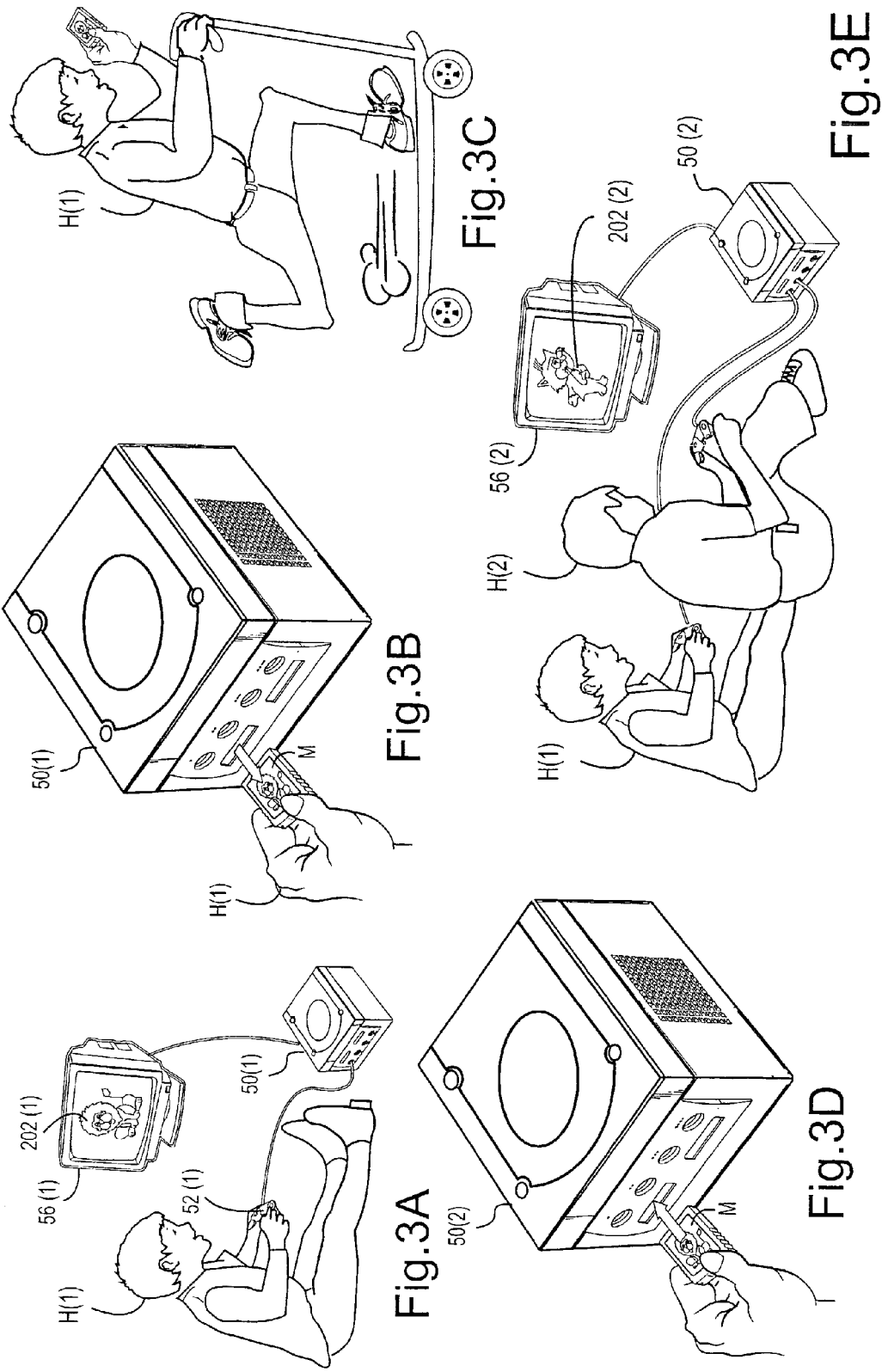

One example data sharing arrangement is illustrated in FIGS. 3A–3E. Referring to FIG. 3A, a player H(1) uses his own video game platform 50(1) to play the role playing game and to create an instance of a virtual game environment 202(1). After performing a data save onto a portable memory M coupled to the home video game platform 50(1), the player H(1) removes the portable memory from his own home video game platform (see FIG. 3B) and takes it to a friend's house (see FIG. 3C). At the friend's house, the player H(1) inserts the memory M into his friend's home video game platform 50(2). The player H(1) and/or his friend H(2) may now play the role playing game using the friend's instance of virtual game environment 202(2) into which characters, objects and information originating in the original instance of the role playing virtual game environment 202(1) have been shared or injected (see FIG. 3E). Similarly, the friend's home video game platform 50(2) may write certain data onto the portable memory M which, when returned to the original home video game platform 50(1) and coupled to the original instance of the virtual game environment 202(1), may share or inject characters, objects, or other information originating in the second virtual game environment 202(2) into the first virtual game environment 202(1).

Figure 4:
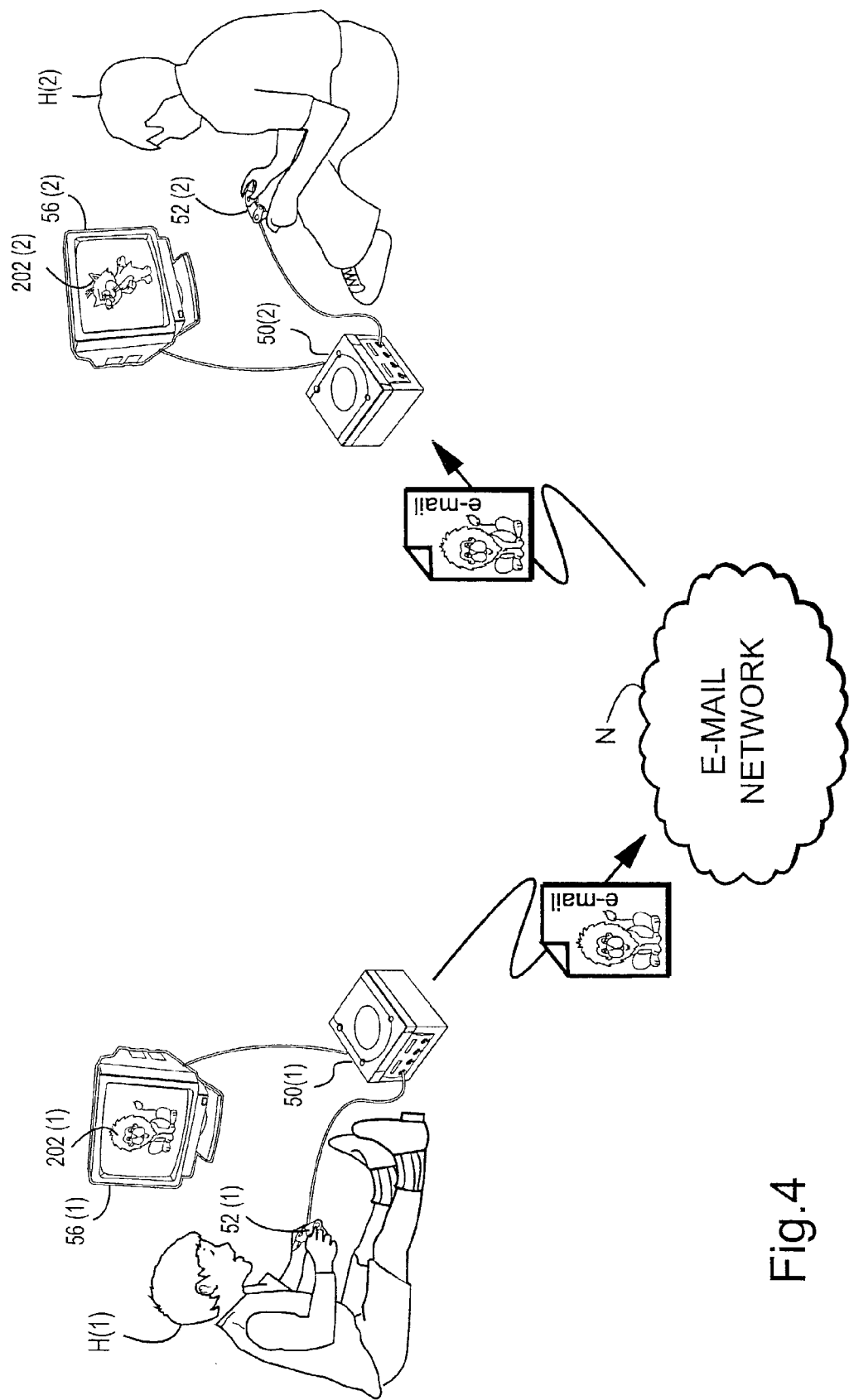
FIG. 4 shows another example technique for data sharing.

While the physical transportation of a removable, non-volatile memory M from one virtual game environment instance 202(1) and associated home video game platform 50(1) to another virtual game environment instance 202(2) and associated home video game platform 59(2) is a practical and convenient way to exchange and transfer data, other data exchange techniques are also possible. For example, as shown in FIG. 4, it would be possible to intermittently connect the respective home video game platforms 50 to an electronic mail or other data exchange network N such as for example the Internet, a gaming network, a telephone network, a server or non-server based data communications capability, or by other interconnection means, to allow data to be shared by transmitting it in an electronic mail or other format between the two video game platforms. It would also be possible to post such data on a central server via such a network N for later download by other home video game platforms over the same or different network. In still another example arrangement, it might be possible for a limited amount of data to be exchanged between virtual game environment instances 202 by having players H manually input codes via controllers 52 or other user input devices.

Figure 5B:
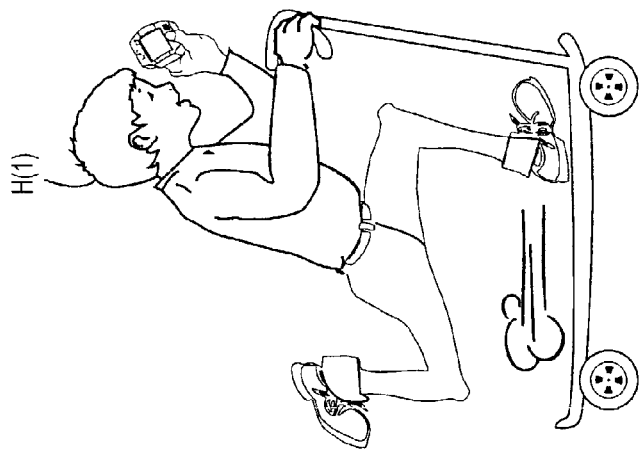
FIGS. 5A–5C show a further example technique for data sharing.
Figure 5A:
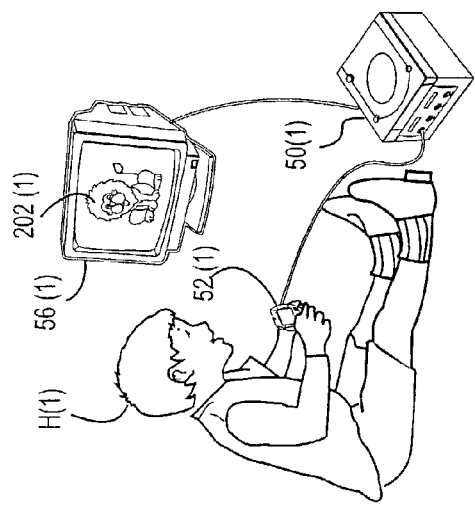
Figure 5C:
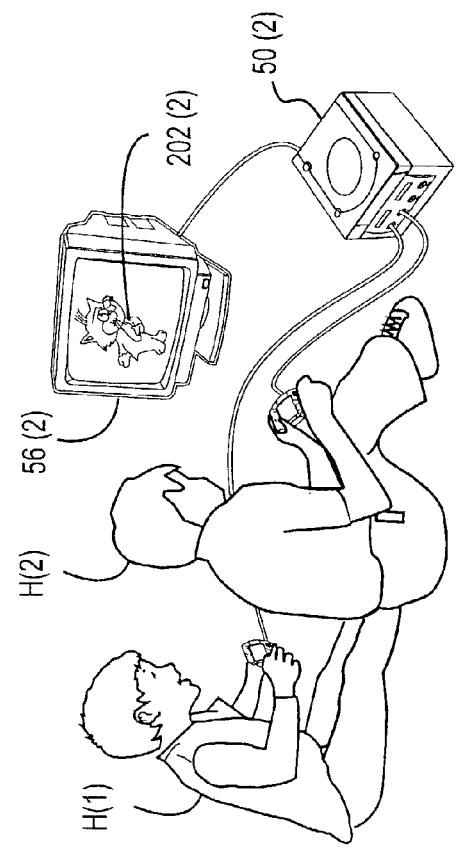

In still another exemplary arrangement illustrated in FIGS. 5A–5C, the player H can download data from his or her home video game platform 50 into an intermittently-connectable portable video game platform AGB. Portable video game platform AGB may include, for example, user controls and a liquid crystal display and be battery powered so as to allow portable game play. The user may be able to play a limited form of the role playing game and/or customize certain data using the portable game player AGB (see FIG. 5B), and may transport the portable video game platform to a friend's house for use in sharing data between virtual game environment instances 200. The portable gaming platform AGB thus may become a repository for data exchanges between the two video game platforms 50.

EXAMPLE DETAILED DATA STRUCTURES

Figure 6:
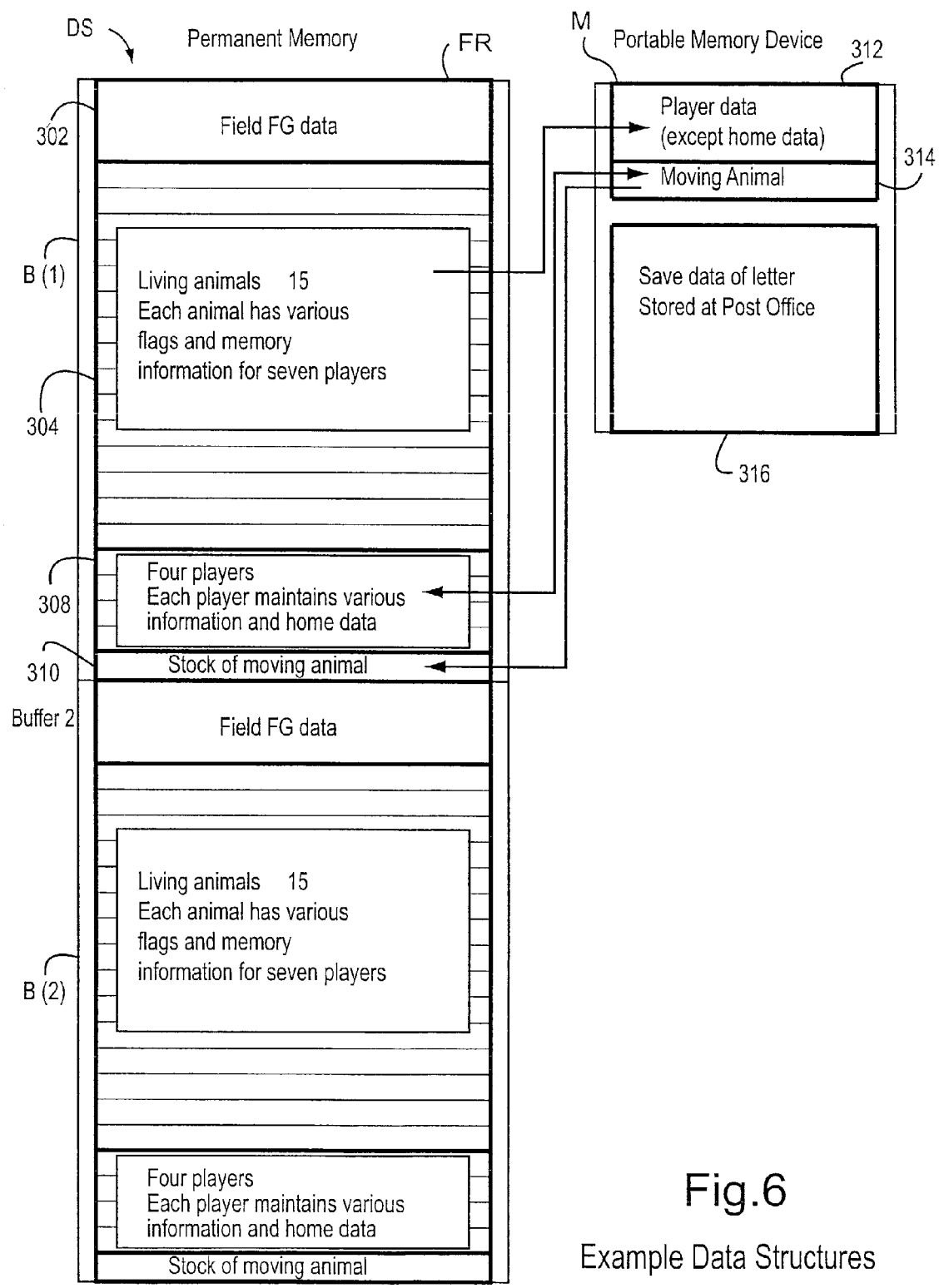
FIG. 6 shows example data storage on resident and removable memory.

FIG. 6 shows an example illustrative data structure DS used to support an exemplary virtual game environment 202 in one illustrative embodiment. The FIG. 6 exemplary data structure DS may be stored in a non-volatile storage FR consisting, for example, of a one megabyte flash ROM within a game cartridge. In this example embodiment, a smaller non-volatile random accessory memory (battery backed) RAM may also be inserted into a game controller 52 or other port to receive and share data. In the example embodiment, data structure DS includes two buffers B(1) and B(2). These two buffers B(1), B(2) are used to store virtual game environment 202 data in a double-buffering arrangement (e.g., one buffer may be written to while the other is read from, thereby preventing loss of data while not requiring extensive amounts of random access memory during active game play).

In the exemplary embodiment shown, each buffer B stores the following data:
 "field goods" data section 302,
 living animal data section 304,
 memory information data section 306,
 player data section 308,
 stock of moving animal data section 310.

In the illustrative embodiment, the field goods data section 302, the living animal data section 304 and the player data section 308 define the variable characteristics of the virtual game environment 202. For example, the field data section 302 defines topographic and field good data to define the overall layout of the virtual game environment instance 202 and the objects that are within it. The non-player character data section 304 defines the various non-player characters 208 within the virtual game environment instance 202. The player data section 208 defines the various player characters 206 within the virtual game environment instance 202 as well as the layout of dwellings 204 associated with each player character 206 (e.g., the furniture and other goods that are present in the various rooms and the like).

In the example embodiment, the "field goods" data section 302 stores records of goods within the instance of virtual game environment 202. In the exemplary embodiment, this data section 302 may, for example, contain thirty blocks each consisting of 16×16 units—with each good being stored within one unit. Thus, in the exemplary embodiment, there may be 16×16×30 different goods (e.g., objects) uniquely defined within each virtual game environment instance 202.

In an example embodiment, the living animal data section 304 may store data associated with player characters 206. In the exemplary embodiment, data section 304 may store records representing up to a certain number (e.g., fifteen) different player characters 206. Thus, each virtual game environment 202 may provide up to fifteen different player characters 206—providing enough memory for seven different players H and various associated information (one per character).

In the exemplary embodiment, the player data section 308 stores data associated with each of four players H, and information including, for example:
 name of player,
 name of player's virtual game environment instance 202 (e.g., village name),
 contents of letters from other players,
 date of last conversation,
 melody of the village (virtual game environment) associated with the last conversation,
 other data.

In the exemplary embodiment, the player data section 208 stores additional information about each player including, for example:
 player's objects,
 amount of money possessed by the player,
 location of each object (furniture, loans, etc.),
 other flags,
 other data.

In the exemplary embodiment, the moving animal data section 310 stores data associated with non-player characters 208 that originated from other virtual game environment instances 202 and have traveled to the current virtual game environment. In the exemplary embodiment, non-player characters 208 that originated from other virtual game environments 202 appear at next game play. Accordingly, when associated data is first transferred, it is stored within the data section 310 in the exemplary embodiment before being introduced into the current virtual game environment.

In the exemplary embodiment shown in FIG. 6, the portable memory M is used to transfer data between home video platforms 50 and associated virtual game environment instances 202. In the exemplary embodiment, this data to be transferred may include, for example:

- player data 312 (except for "home data," which remains within the memory FR and is not transferred in the exemplary embodiment),
- moving animal data 314 (e.g., non-player characters 208 that are originating from data section 204 but are being transferred from one virtual game environment instance 202 to another),
- communications data 316 (e.g., letter contents of letters being written from a player character 206 inhabiting one virtual game environment instance 202 to a player character inhabiting another virtual game environment.

Figure 7:
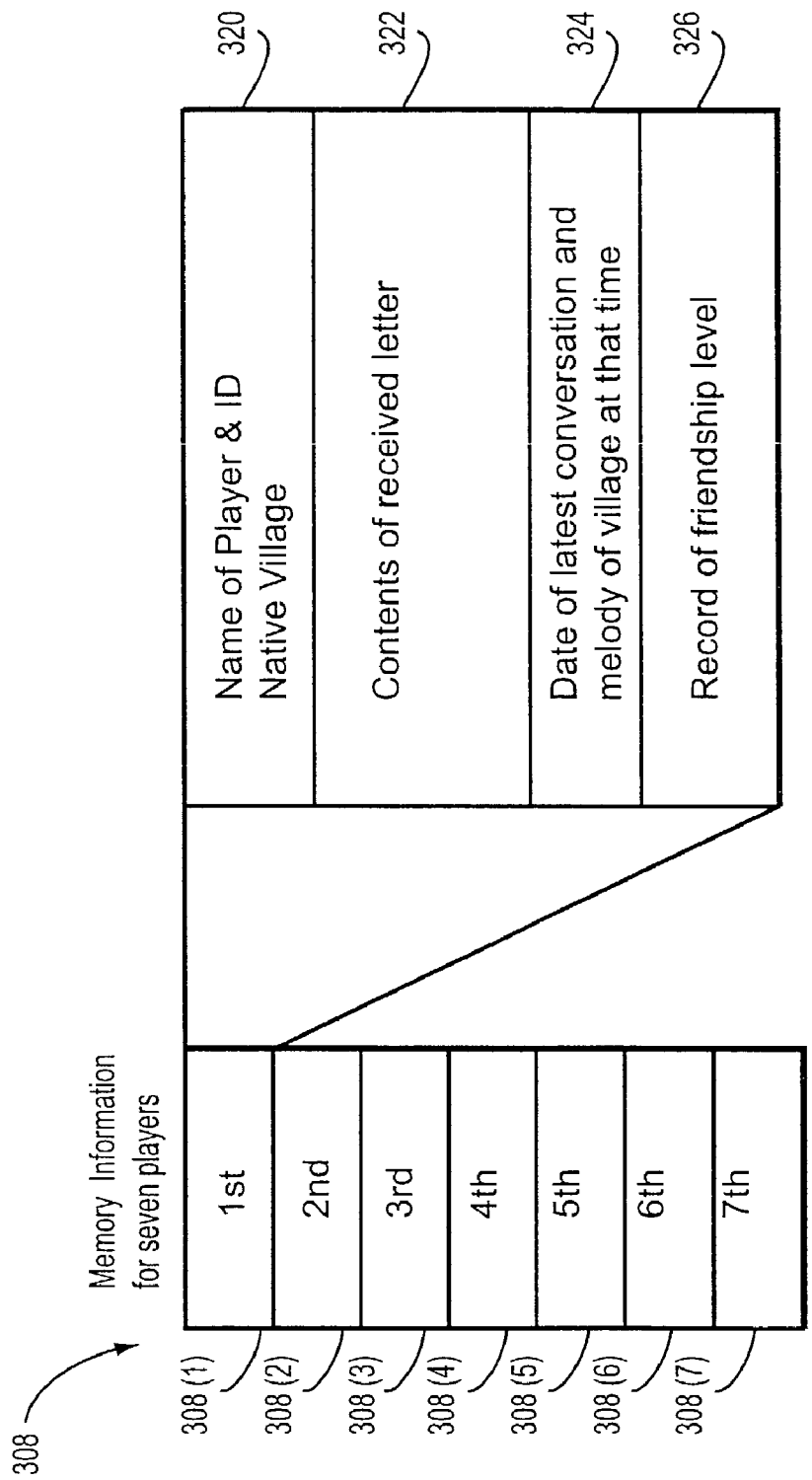
FIG. 7 shows an example illustrative player data structure.

FIG. 7 shows, in more detail, the contents of an exemplary player data section 308. In the exemplary embodiment, the memory information for each of seven players 308(1)–308(7) may each include:

- a name record 320 specifying the name of the player and an identifier of the player's native virtual game environment instance 202 (e.g., native village),
- the contents of any received letter data section 333,
- the date of latest conversation and melody of the virtual game environment at that time (record 324),
- record of friendship level 326.

FIG. 8 explains in schematic form how the various data within the FIG. 6 data structures are used in an exemplary illustrative embodiment of a role playing game. In the FIG. 8 example, player characters 206 associated with up to four players H may "reside" in a given virtual game environment 202 (e.g., village) and share the data associated with that virtual game environment. These four players H may, in one illustrative embodiment, play one at a time but not simultaneously. However, in another variation, they may play video game platform 50 simultaneously through use of four independent handheld controllers 52.

A player character 206 originating from another virtual game environment instance 202 may visit a different virtual game environment instance by having the data associated with that player character 206 being stored and presented in the portable data section 312. Note that this player character 206 is not resident within the virtual game environment instance 202 because his or her data is not stored as "home" data in the FR storage. However, this player character 206 may interact with the virtual game environment instance 202 he or she is visiting, and may collect and gather objects from that virtual environment that he or she may bring "home" to his or her "home" virtual game environment instance 202.

In the exemplary embodiment, a non-player character 208 that moves from one virtual game environment instance 202 to another has its data transferred from the "home" data section 304 to the portable data section 314. As shown in FIG. 8, such moving animal data is injected into the virtual game environment instance 202 at the time the game is next started. Thus, a newly moved in animal "settles" into the new virtual game environment instance 202 at the time of next game play initialization. In the exemplary embodiment, non-player characters 208 that move to other virtual game environment instances 202 maintain their memory information and remember the player characters 206 they have met in the past. In one exemplary embodiment, the non-player characters 208 may remember the last seven player characters 206 they have come into contact with.

In the exemplary embodiment, letters and other communications 316 may be injected into a virtual game environment instance 202. Similarly, letters from one virtual game environment instance 202 may be send out via the portable memory RAM for communication to another virtual game environment instance.

Figure 9A:
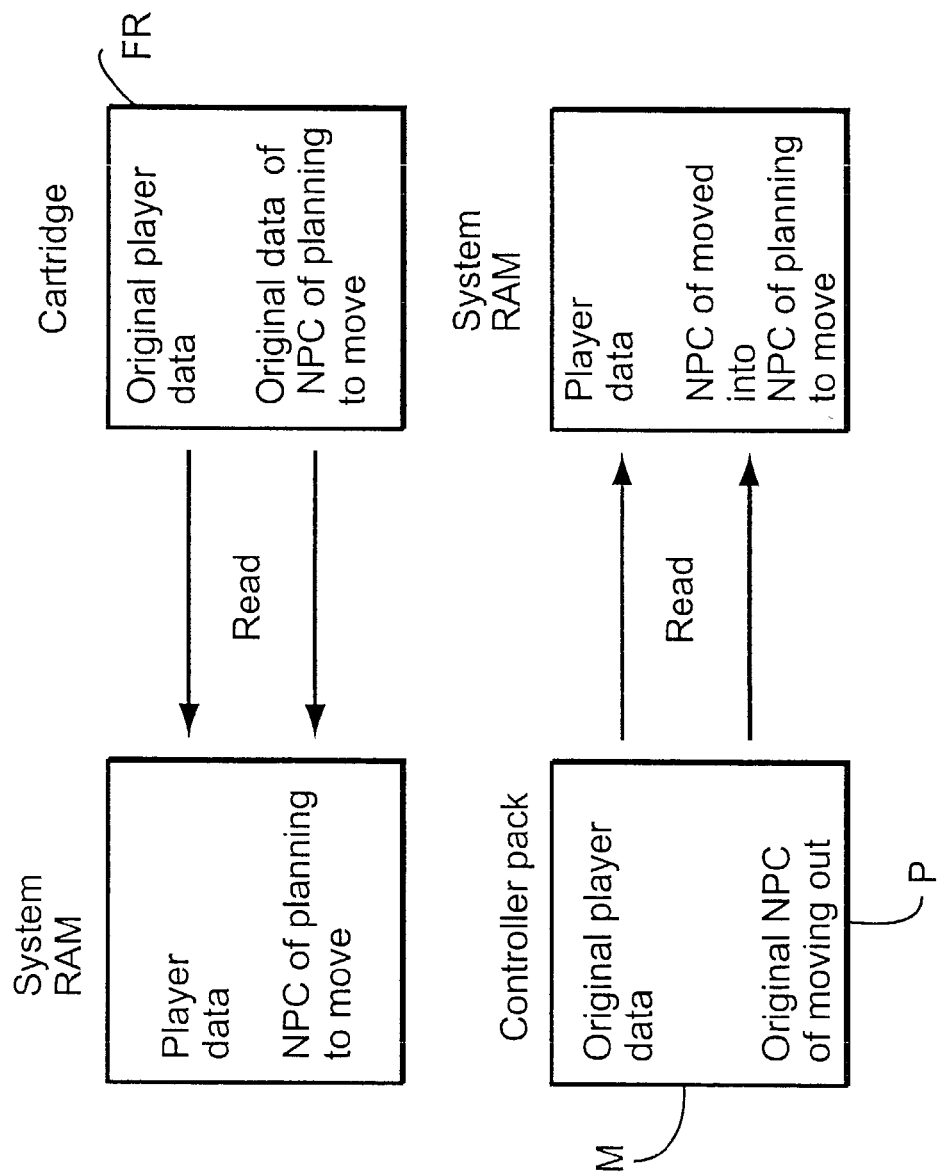
FIGS. 9A–9B show an example data exchange for allowing a character to move from one virtual game environment instance to another.
Figure 9B:
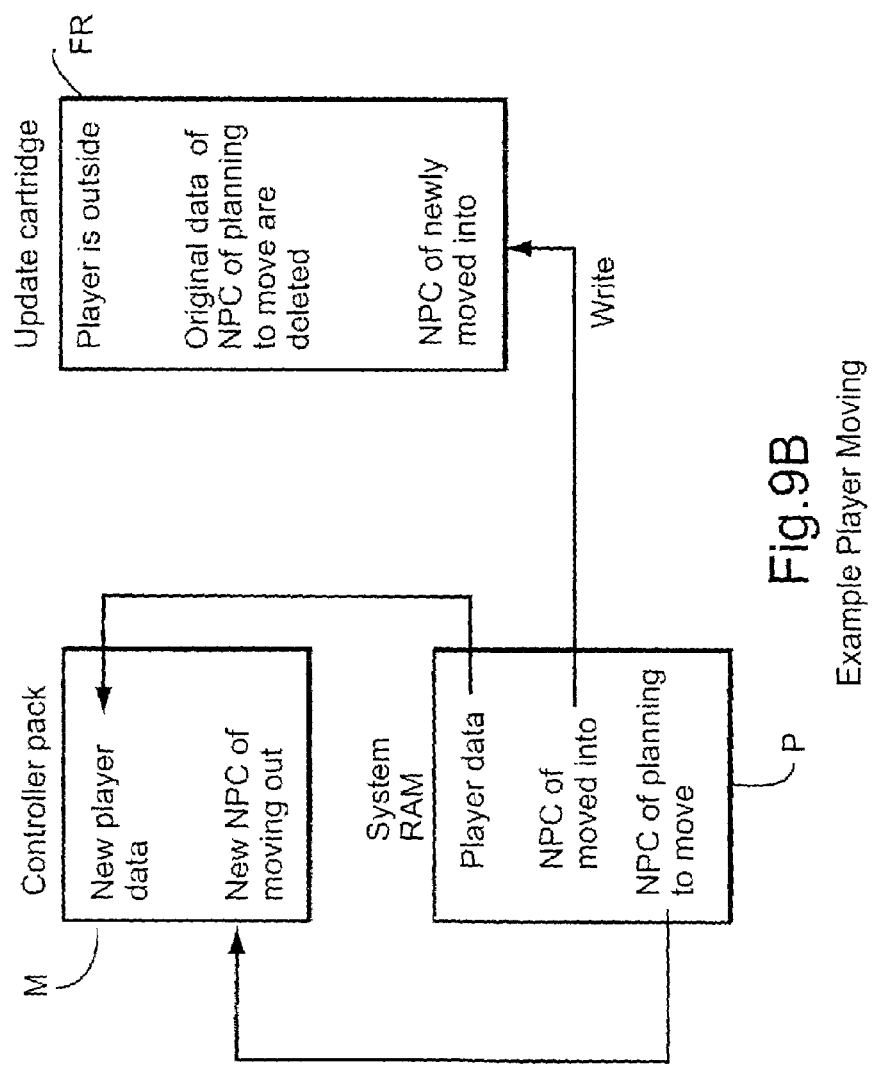
Figure 10:
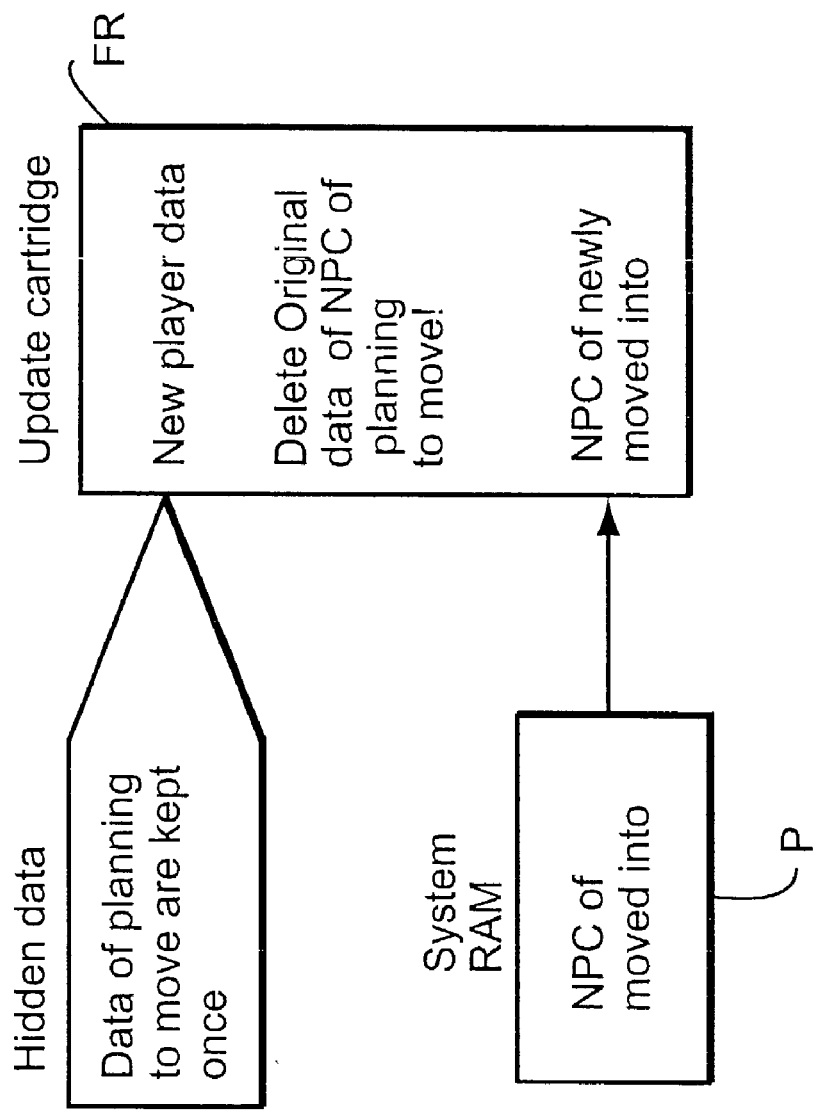
FIG. 10 shows an example data storage using hidden data to schedule a non-player character move.

FIGS. 9A–9B and 10 show schematically how, in one exemplary illustrative embodiment, a non-player character 208 may move from one virtual game environment instance 202 to another. In the exemplary embodiment, whenever a player H begins playing the game, one non-player character 208 is randomly selected as planning to move. However, whether or not this non-player character 208 that has been selected as possibly moving to a different virtual game environment instance 202 actually does move depends on some additional conditions in the exemplary embodiment. In particular, a moving admission flag needs to be available in order for a non-player character 208 to move. This moving admission flag is available if there is enough room within the portable memory M to accommodate the moving character, for example. As shown in FIG. 9A, data may be written from the "home" storage FR to the portable storage M based upon such conditions.

In the exemplary embodiment, if the player who began playing the game is a non-resident player character 206, then the player data is loaded from the portable memory M. It there is moving non-player character 208 data within this portable memory M, then such data is loaded into the virtual game environment instance 202 as non-player character 208 data moved in from outside of the current virtual game environment. Player data and moving non-player character data within the "home" storage FR should be maintained to prevent the virtual game environment instance 202 from losing its uniqueness and/or the history of its resident player characters 206.

In the exemplary embodiment, if a non-player character 208 is planning to move and this has been newly selected, the non-player character 208 sends a letter notifying the resident player characters 206 of the non-player character 208's forwarding address. In the exemplary embodiment, the "change of address" notice includes a request to the resident player characters 206 to send the moving non-player character 208 notes from time to time. In the exemplary embodiment, when a player character 206 is sent a letter from a non-player character 208 who is planning to move, the contents of the letter is copied into the memory area of the non-player character who is planning to move. If multiple letters are being sent, only the last letter is retained in the exemplary embodiment.

If any player characters 206 go on a visit to a different virtual game environment instance 202 after saving associated data into the "home" memory area FR, the player data and data representing non-player characters 208 who are planning to move is stored into the portable memory M and the associated player data and the non-player character 208 data of non-player characters planning to move are deleted from the "home" data storage area FR. In this way, a particular character exists in only one virtual game environment 202 at a time. Thus, once a player character 206 had its data stored within the portable memory M, this player is "outside" of the originating virtual game environment instance 202 (see FIG. 9A). Similarly, the data representing non-player characters 208 that are moving into the current virtual game environment instance 202 are written into the "home" memory storage area FR and deleted from the portable memory storage area M (see FIG. 10B).

If a player character 206 originates from outside of the current virtual game environment instance 202, there is no need to copy this player data into the "home" game storage area FR. Rather, this data remains in the portable game storage area M so that it can be returned to its originating virtual game environment instance 202. At the time that player character data 206 is stored into the portable memory M, any non-player characters 208 that are planning to move are also stored into the portable memory device. In the exemplary embodiment, any non-player characters 208 stored within the portable memory M that have moved from another virtual game environment instance 202 may at this time be read from the portable memory M and stored into the "home" storage FR.

In the exemplary embodiment, if a resident player character 206 is the player character who has started game play and the portable memory M contains data associated with a non-player character 208 that is to move into the virtual game environment instance 202, then a special check is performed. In particular, in the exemplary embodiment, a player character 206 resident in a particular virtual game environment 202 may not always save data into the portable memory M at the end of each gaming session. Accordingly, a non-player character 208 that is planning to move into the current virtual game environment instance 202 may not yet be able to do so because there may not be enough room to let this non-player character move in. More specifically, in the exemplary embodiment, only a certain limited number (e.g., fifteen) non-player characters 208 may be admitted into a virtual game environment instance 202 at any one time. Accordingly, one of the non-player characters 208 may need to move out of the current virtual game environment instance 202 before a new one can move in. In the exemplary embodiment, this issue is handled as shown in FIG. 10. In particular, data of a non-player character 208 planning to move is stored into the portable memory M as if this non-player character had already moved out. However, messages informing the player character residents 206 of the impending move are not dispatched until the non-player character 208 has actually been transferred to a different virtual game environment instance 202 and another non-player character 208 has been stored in its place in the portable memory M to move into the current virtual game environment instance. In this way, non-player characters 208 are constantly moving between virtual game environment instances 202—thus maintaining a high level of interest and variability in the game play. At the same time, the particular protocol shown in FIG. 10 is used to prevent one non-player character 208 from actually moving out of a virtual game environment instance 202 until it has actually been transferred to another virtual game environment instance and replaced by a different non-player character.

In the exemplary embodiment, the contents of the temporary memory M are retained until rewritten in a correct fashion in order to prevent data from being lost in the case where a player H shuts down the game system without correctly quitting the game and allowing it to run through the game save sequence. However, it is important to monitor whether the temporary memory M is inserted into the video game platform 50 at time of game play, since it is possible that a player might try to pull the temporary memory M out in the middle of game play and replace it with a new temporary memory device in order to provide copying of temporary memory device contents. In the exemplary embodiment, if the temporary memory M is removed from the portable video game system 50 in the middle of game play, game play will halt until the same portable memory M is reinserted (thus preventing copying of data that might result in "cloning" certain non-player characters 208 so they could exist in multiple different virtual game environments 202 simultaneously).

EXAMPLE MESSAGE DELIVERY AND DISTRIBUTION

In the example and illustrative embodiment, players H may not necessarily simultaneously be playing within a given virtual game environment 202, but may wish to exchange information with one another via messaging capabilities. In the exemplary embodiment, the virtual game environment 202 models a postal delivery system for the distribution of mail. As shown in FIG. 11A, any given player character 206 may author and distribute mail to other resident or non-resident player characters. As shown in FIG. 11, a letter L may be addressed to a particular player (e.g., player P3), or it may be addressed to all players (e.g., in the form of leaflets). The post office PO may have a capacity to accept only a limited number of letters (e.g., when five letters are already held at the post office, a sixth letter might not be accepted). In the exemplary embodiment, the post office PO delivers the letters to mailboxes MB1, MB2, MB3, MB4 associated with corresponding player characters P1, P2, P3, P4 at certain predetermined delivery times.

In the example embodiment, a "post office" building is defined as a certain location within the virtual game environment 202. In the example embodiment, a non-player character 208 is assigned to operate as a postal office clerk to run the post office. In one example embodiment, there may be two different non-player characters 208 who serve as postal office clerks—one may work during a daytime shift and another may work during a nighttime shift. The postal clerk non-player character 208 delivers mail and leaflets to each player character 206's mailbox MB. The post office clerk may make these deliveries at predetermined real times during the day (e.g., once in the morning and once in the evening at specific times). Between delivery times, the postal clerk non-player character 208 may hold the letters and leaflets in the post office PO.

In the example embodiment, a maximum of a certain number of letters (e.g., five) can be held by the post office PO at any one time. More than this predetermined number of letters cannot be held. If a player attempts to send an additional letter through the post office PO when the post office already holds its capacity of letters, the non-player character 208 postal clerk may turn down receipt through a conversation and ask the player character 206 to return later. In the example embodiment, when the post office holds a letter, the letter is held and stocked once irrespective of whether the letter is addressed to a player character 206 or to a non-player character 208. If the mailbox MB of a particular player to whom a letter is addressed is full, no new letters can be sent to that player until the player reads the mail in his mailbox. The non-player character 208 postal clerk may also refuse receipt of letters having an address that does not exist in a particular virtual game environment instance 202. In the example, embodiment, the post office PO continues to hold letters that are not deliverable for some reason.

In the example embodiment, the non-player character postal clerk delivers mail at regular delivery times. However, in the example embodiment, once a predetermined maximum number of letters is being held by the post office PO, the postal clerk makes a special delivery. If the postal clerk non-player character refuses receipt of a new piece of mail, the postal clerk non-player character is sent out when a player leaves the post office. Because a letter addressed to a player is accepted while it is still being determined whether any space remains in the post office PO in one embodiment, a situation that letters more than the number that are deliverable end up being accumulated will probably not happen very often.

In the example embodiment, if the particular virtual game environment 202 is not in session (e.g., the player H is not playing the game) at the time the next mail delivery is scheduled, the mail delivery is made during an initial part of the next game session. Thus, the preferred embodiment saves the time of the last mail delivery so it can be referenced later during a subsequent game session.

It is possible for non-player characters 208 to move from one virtual game environment 202 to another while a letter addressed to the non-player character is still being held at the post office PO pending delivery. In the example embodiment, a special delivery is made to deliver a letter being held for a non-player character 208 at the time the non-player character gets ready to leave the virtual game environment instance 202 to travel to another virtual game environment instance.

Figure 11B:
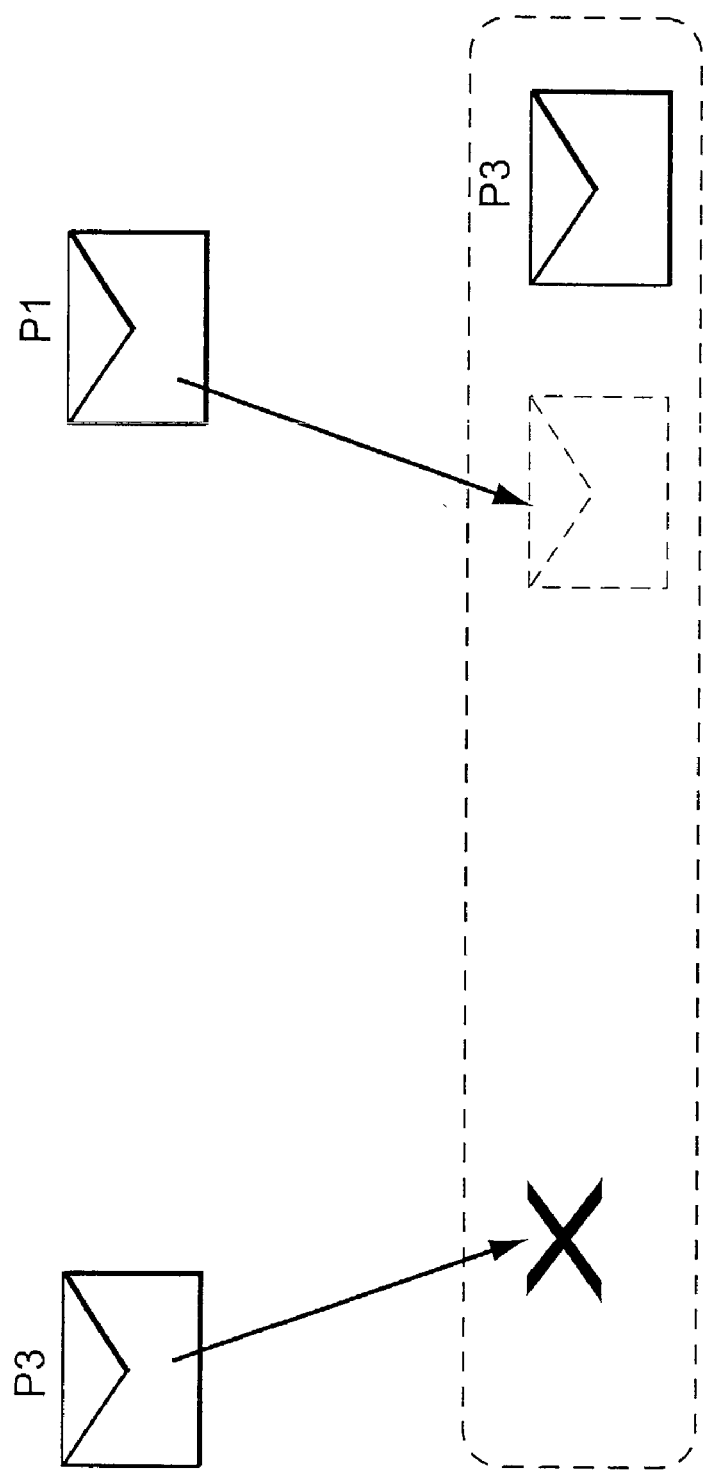

FIG. 11B shows the example where the total number of letters in the mailbox and held by the post office PO is already at a maximum. At that point, a new letter to a given address will not be accepted (in the example shown, the mailbox has one empty space and the post office PO holds one letter—therefore the space is full). In the example embodiment shown in FIG. 11, if the total number of pieces of mail being held by the post office is less than a predetermined maximum number (e.g., ten letters), then a letter will be accepted.

Figure 12:
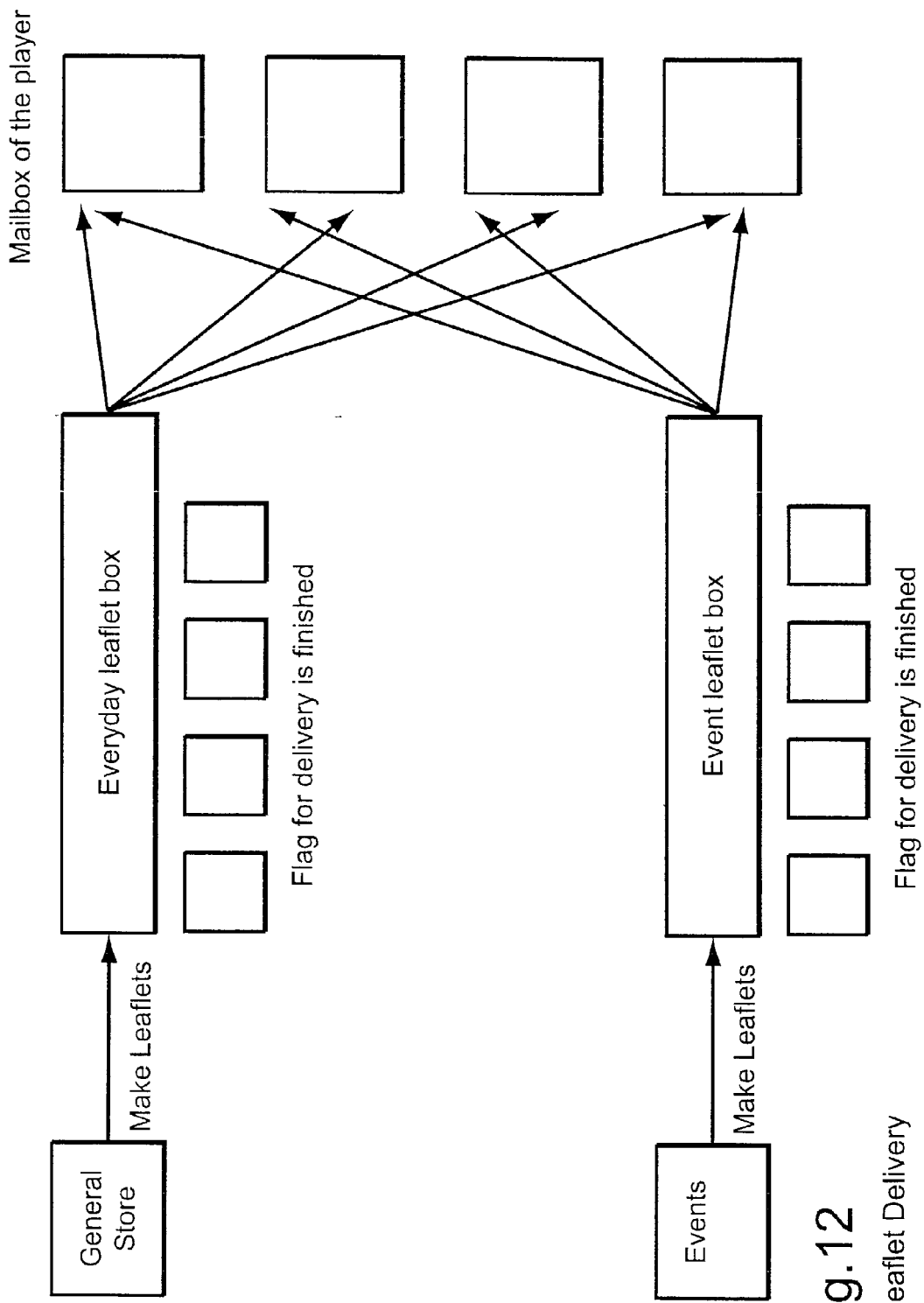
FIG. 12 shows example illustrative leaflet delivery.

FIG. 12 shows an example arrangement of how mail may be delivered within a virtual game environment 202. In the exemplary embodiment, either leaflets or letters may be delivered. Leaflets may be delivered by storing leaflet data into predetermined storage areas. In the exemplary embodiment, data storage areas for storing leaflet data t be delivered may be divided into two different areas:

everyday leaflet delivery, event leaflet deliver.

Leaflets announcing upcoming events may be stored once in the event leaflet box. Everyday leaflets that are to be delivered to particular players may be stored in the everyday leaflet box. Leaflets stored in each leaflet box are delivered to the associated player's mailbox at the same time as mail delivery. If the player's mailbox does not have enough space, then the mail is held in the exemplary embodiment. The exemplary embodiment maintains flags for the two leaflet boxes in order to keep track of which players have received delivery of which leaflets. This permits delivery retries (e.g., in the case that a player's mailbox was full such that leaflet delivery was impossible). In the exemplary embodiment, delivery is repeatedly tried until it is completed. After a particular leaflet has been delivered to all resident player characters 206, the associated leaflet data is deleted from the leaflet delivery boxes. In the exemplary embodiment, if new leaflet data must be stored even though old leaflet data remains to be delivered, the new leaflet data takes priority and the old leaflet data is erased.

Figure 13:
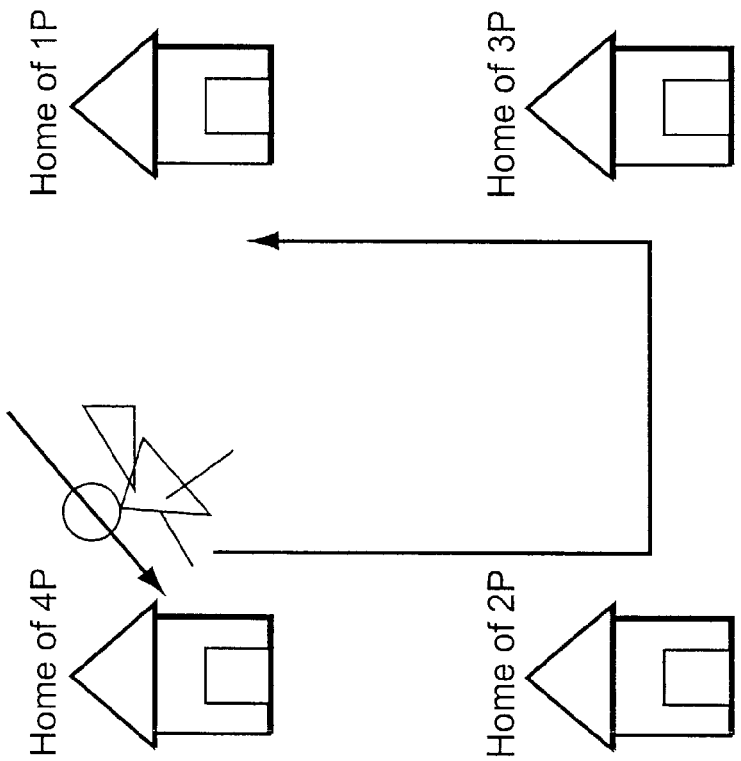
FIG. 13 shows example mail and leaflet delivery techniques.

Referring to FIG. 13, leaflets and letters are delivered by the postal clerk non-player character 208 simultaneously at predetermined real times (e.g., 9 AM and 5 PM). When mail and leaflets are being delivered, this may be indicated within a virtual game environment 202 by animating the appearance of a mail delivery character (e.g., a pelican postman) that appears if the player character 206 is within his or her dwelling 204. If the player character 206 is not at home, then the software simply "delivers" the mail into the player's mailbox (and may animate a "full" mailbox or raise a flag so that when the player returns home, he or she will see that mail has been delivered).

In one exemplary embodiment, even if the player character 206 is not within his or her dwelling place 204 when the postman arrives to deliver mail, the postman may go to the home of a player who is at home at the time. See FIG. 13. Even if a postman could walk around blocks other than the player's home for mail delivery (e.g., around ten minutes), it is desirable to have the postman remain for a while because this gives a player character 206 a chance to have a conversation with the postman. Therefore, the software may take precautions to ensure that the player character 206 is not distracted by other non-player characters 208 while the postman non-player character is in the environs.

In the exemplary embodiment, when the postman appears, he goes first to the mailbox of the player character 206 who is playing the game, and then delivers all of the resident player character mail at the same time. In the exemplary embodiment, the player character may raise a red flag on each dwelling place 204 after making his rounds to indicate that mail has been delivered.

Figure 14:
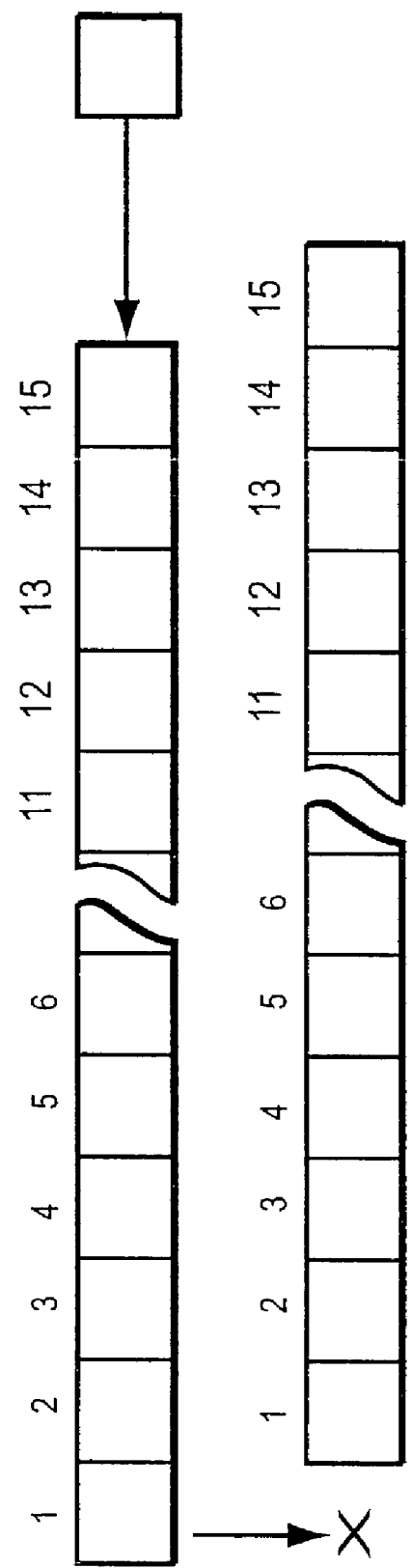
FIG. 14 shows an example bulletin board.

An additional means of convenient communication between player characters 206 may involve the use of a centralized bulletin board (e.g., a posting board at the center of a virtual village). In the exemplary embodiment, a bulletin board may be disposed at a predetermined geographic location within the virtual game environment instance 202. A certain predetermined maximum number of entries may be written onto the bulletin board. In the exemplary embodiment, the content of each bulletin board entry may be, for example, ninety-six letters (sixteen letters per line on each of six lines) plus the date of entry (year, month, day, for example). In the exemplary embodiment, a bulletin board window may be displayed if a certain predetermined data input is performed by a player H using the handheld controller 52. In the exemplary embodiment, to post a bulletin board message, the player H needs to input the text message (e.g., using a virtual keyboard or the like) and the game software supplies the date and time automatically. In the exemplary embodiment, entry to the bulletin board is performed from the first page to the last. When a new entry is input after all fifteen pages are already written, the oldest page may be removed, the previous second page may become the new first page, and so on (see FIG. 14). In the exemplary embodiment, when a player views the bulletin board window, the last page entry is displayed and the player may then scroll through the various entries as desired. In the exemplary embodiment, there is no need to sort bulletin entries based on date and time because they are maintained in storage in the proper sequence as described above.

EXAMPLE FLOWCHARTS

FIGS. 15A–15F are together an example flowchart of a main game routine provided by a preferred embodiment of this invention. The exemplary flowchart of FIGS. 15A–15F may be embodied in software that executes on each of the various video game platforms 50.

Figure 15A:
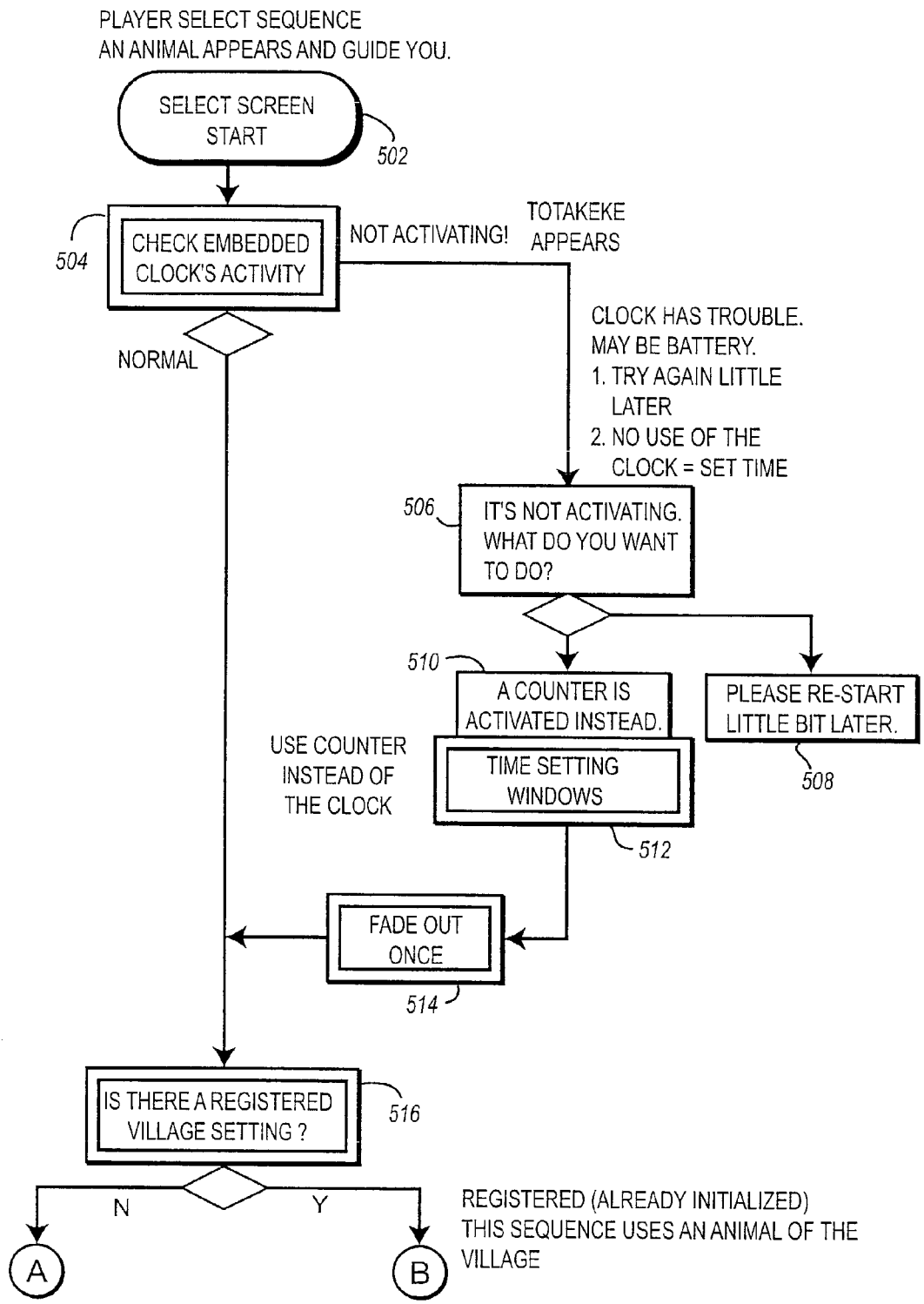
FIGS. 15A–15F show an example main game start flowchart.

Referring to FIG. 15A, upon starting the game a select screen appears to allow the player H to perform a player select sequence (block 502). The routine next checks the embedded real time clock's activity to determine whether the clock is working (block 504). In one embodiment, home video game platform 50 includes an internal real time clock that keeps track of the current time and date. However, if home video game platform 50 does not include an internal real time clock then it may be desirable to provide such functionality as an accessory (e.g., within a game or other cartridge). In still other embodiments, it is possible to prompt the user to input the time and date at the beginning of each game play and to use standard timer functionality as part of a microprocessor to keep track of real time.

If block 504 determines that there is a problem with the real time clock, a character appears on the screen and informs the user that the clock has a problem and asks the user what he wants to do (block 506). The user can choose to restart at a later time (block 508), or may choose to activate a counter to be used instead of the real time clock in order to keep track of the passage of time in the current game play session (block 510). If the user chooses to activate a counter, then the software prompts the user to input the current time and date (block 512), and game play may proceed after a fade out (block 514). As mentioned above, in some home video game platforms 50 without any hardware real time clock capability, the functionality provided by blocks 510, 512 may be used as a default.

The preferred exemplary and illustrative embodiment routine then checks to determine whether a virtual game environment 202 has already been set up (block 516). If virtual game environment has already been set up ("yes" exit to block 516), then the current game play session uses that already-defined virtual game environment and proceeds to the portion of routine shown in FIG. 15C. However, if no virtual game environment 202 has yet been established ("no" exit to block 516), then this is the first time the game has been played and a virtual game environment needs to be established—so program flow proceeds to the steps shown in FIG. 15B.

Figure 15B:
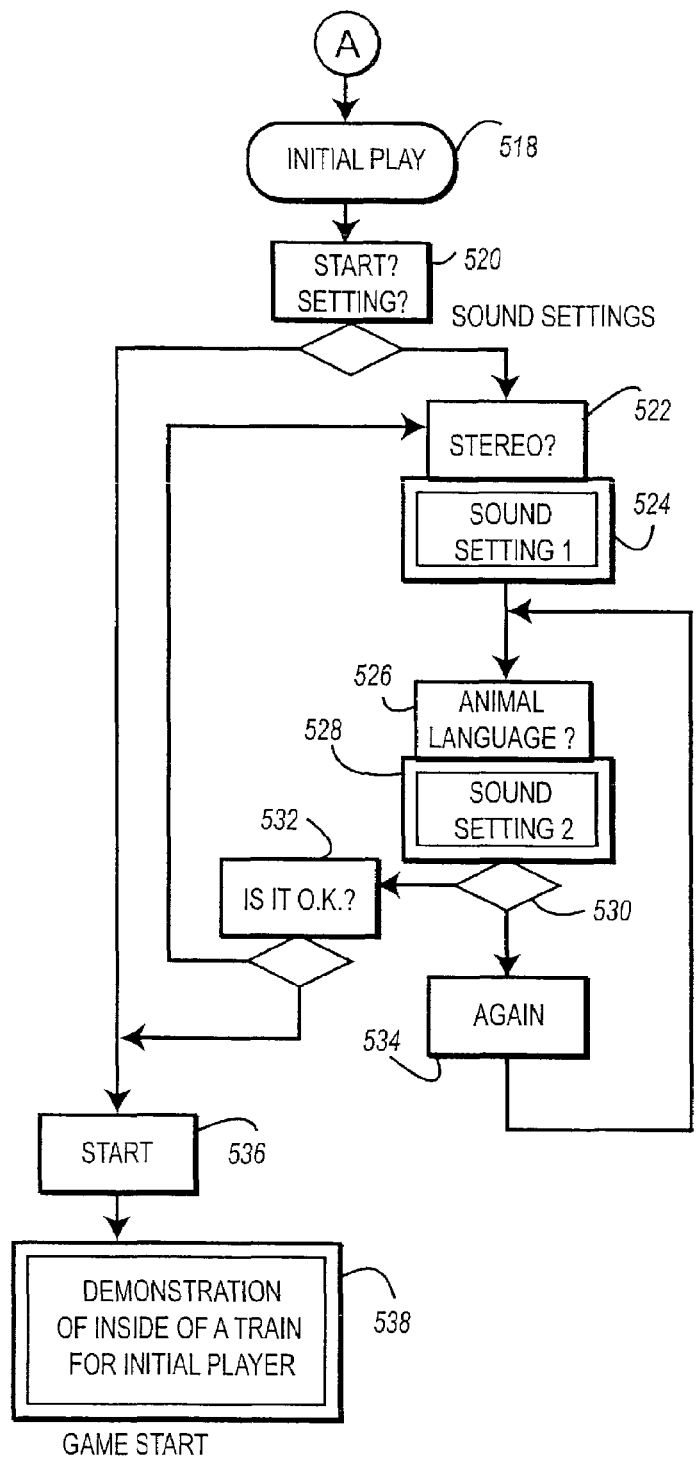

Referring to FIG. 15B, to set up an initial game play and associated virtual game environment 202 (block 518), the user is stepped through a series of prompts that allows the user to select a number of initialization variables. For example, the user may select whether or not to set such variables (block 520), and then may be stepped through sound selection criteria (block 522, 524), character language selection criteria (block 526, 528), and approval criteria (block 530, 532, 534). Once these initialization variables have been set, the game may proceed to a starting sequence (block 536). In one exemplary embodiment, the game shows on display 56 demonstration of an inside of a train to simulate the player traveling by train to the virtual game environment 202 such as a village in a forest (block 538). The program flow may then return to the FIG. 15A sequence.

Figure 15C:
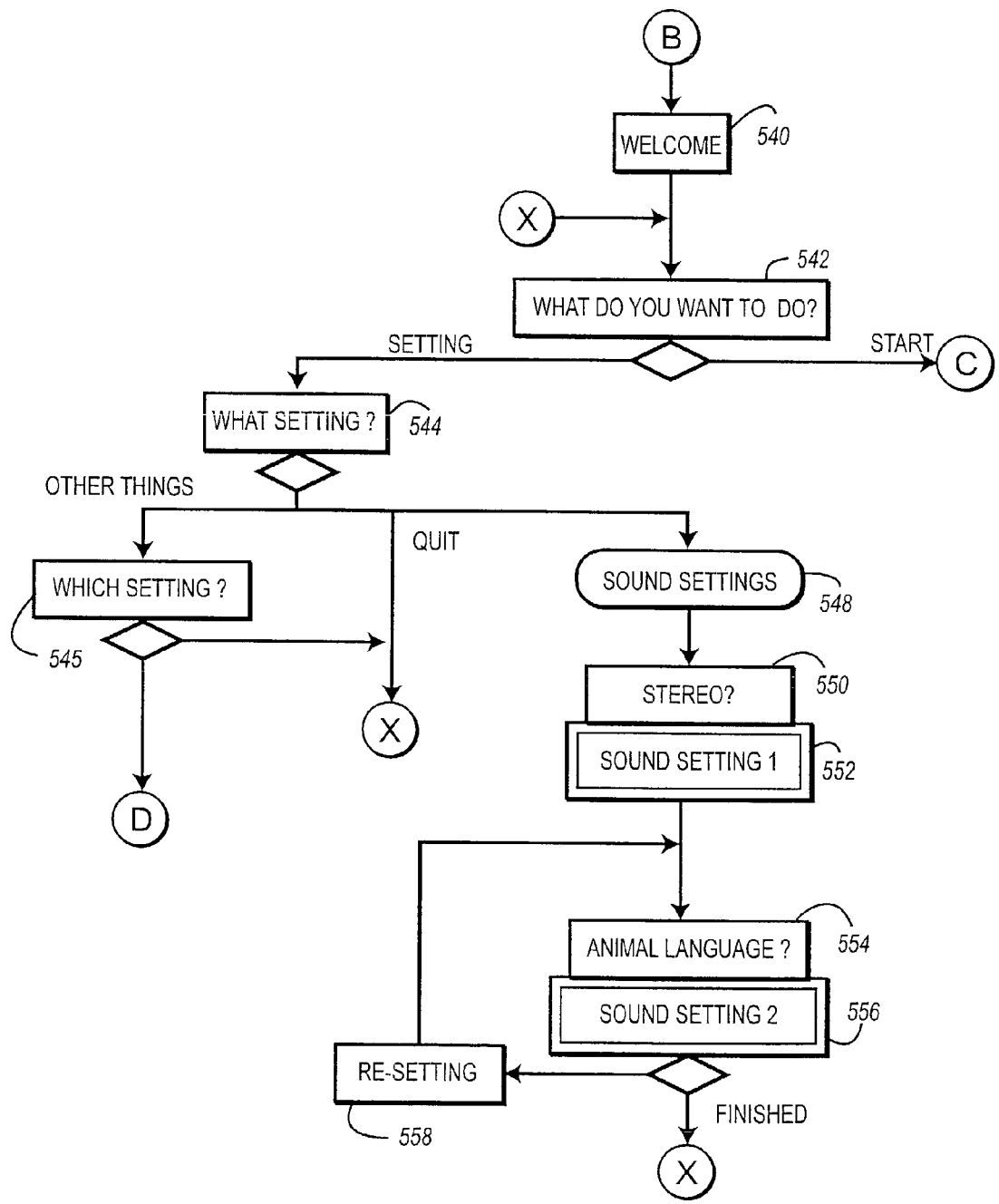
Figure 15D:
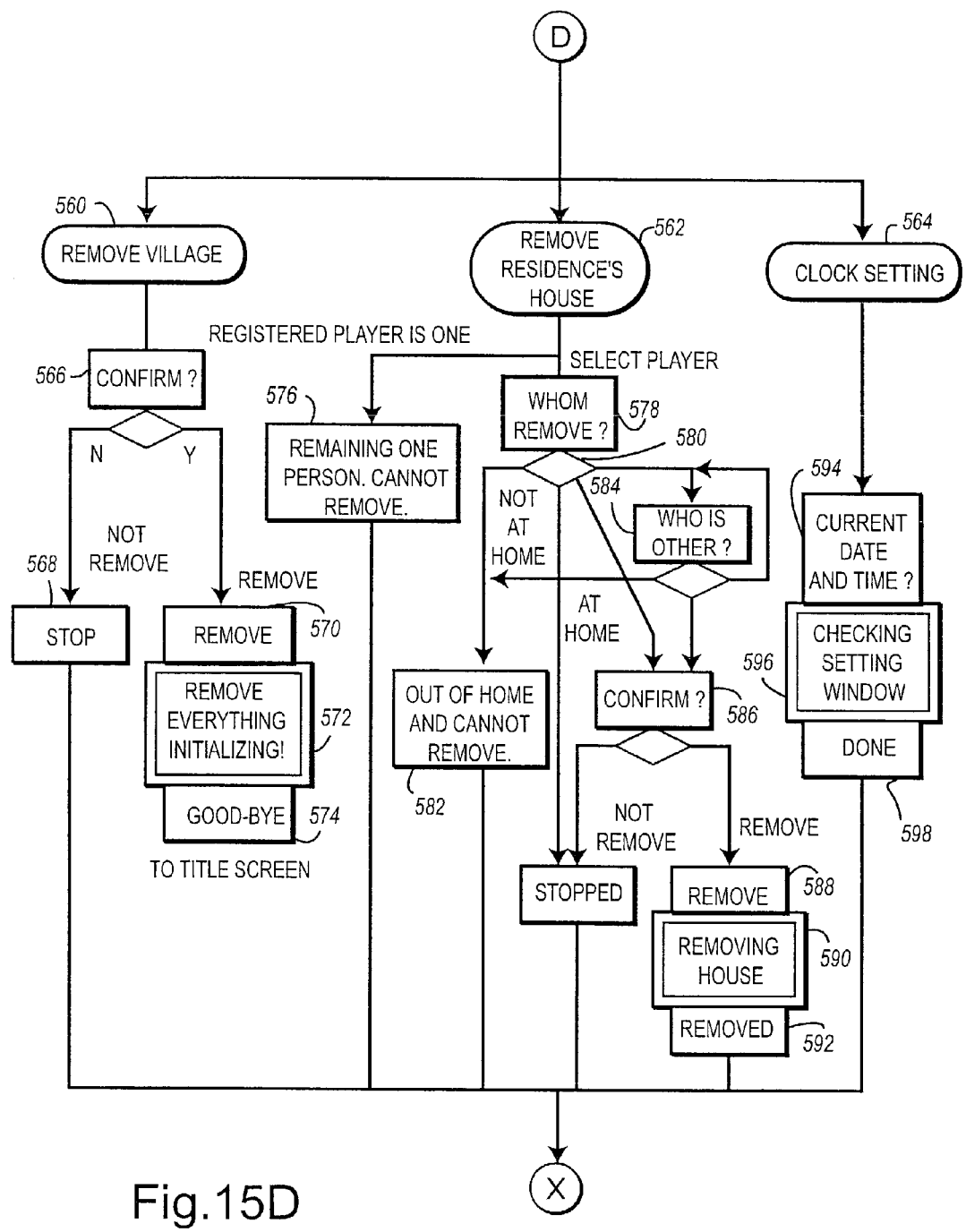

Referring to FIG. 15C, once the game has been initialized appropriately a welcome screen may be displayed (block 540), and then in the exemplary embodiment, the routine asks the player what he or she wants to do—either set certain settings or to proceed with game play (block 542). If the player requests the ability to change certain settings (setting exit to block 542), the routine asks the player to specify the setting to be changed (blocks 544, 546), and may provide a variety of functionality to allow the player to set various parameters (blocks 548, 550, 552, 554, 556, 558) in order to set sound settings, language, etc. On the other hand, if the player selects a prompt to change the virtual environment 202 (D exit shown in FIG. 15C), then control is transferred to the portion of the routine shown in FIG. 15D that gives the player the chance between removing the entire virtual game environment 202 (block 560), removing a particular player character 206 and associated dwelling 204 (block 562), and changing the clock setting (block 564). If the user selects to remove the entire virtual game environment (block 560), then the exemplary routine asks the player to confirm (block 566) and will not delete the virtual game environment in the absence of such confirmation (block 568). If the user does confirm his or her request to remove the entire virtual game environment 202 ("yes" exit to block 566), then the routine removes all stored data defining the virtual game environment and reinitializes (blocks 570, 572, 574).

If the user chooses to remove a particular player character 206 (block 562), then the routine checks whether more than one player character dwells in the virtual game environment 202. If only one player character 206 remains, then the program indicates an error message stating that it cannot remove the last inhabitant (block 576). On the other hand, if more than one player character 206 inhabits the virtual game environment 202 so that one character can be removed without deleting all remaining player characters, then the routine asks which player character is to be removed (block 578). In the exemplary embodiment, the routine will refuse to remove a player character 206 who is not at home (it would be disconcerting for the player H to try to return home with his player character 206 only to discover that someone else had expelled him from the virtual game environment 202 in his or her absence) (block s580, 582). If the player character 206 is at home, then the routine asks the user to confirm removal (block 586) and, upon receiving such confirmation, will delete the player character 206 (blocks 588, 590, 592).

If the user selects the prompt to change the current real time clock setting (block 564), then the routine prompts the user for the current date and time (block 594) and effects this change (blocks 596, 698).

Figure 15E:
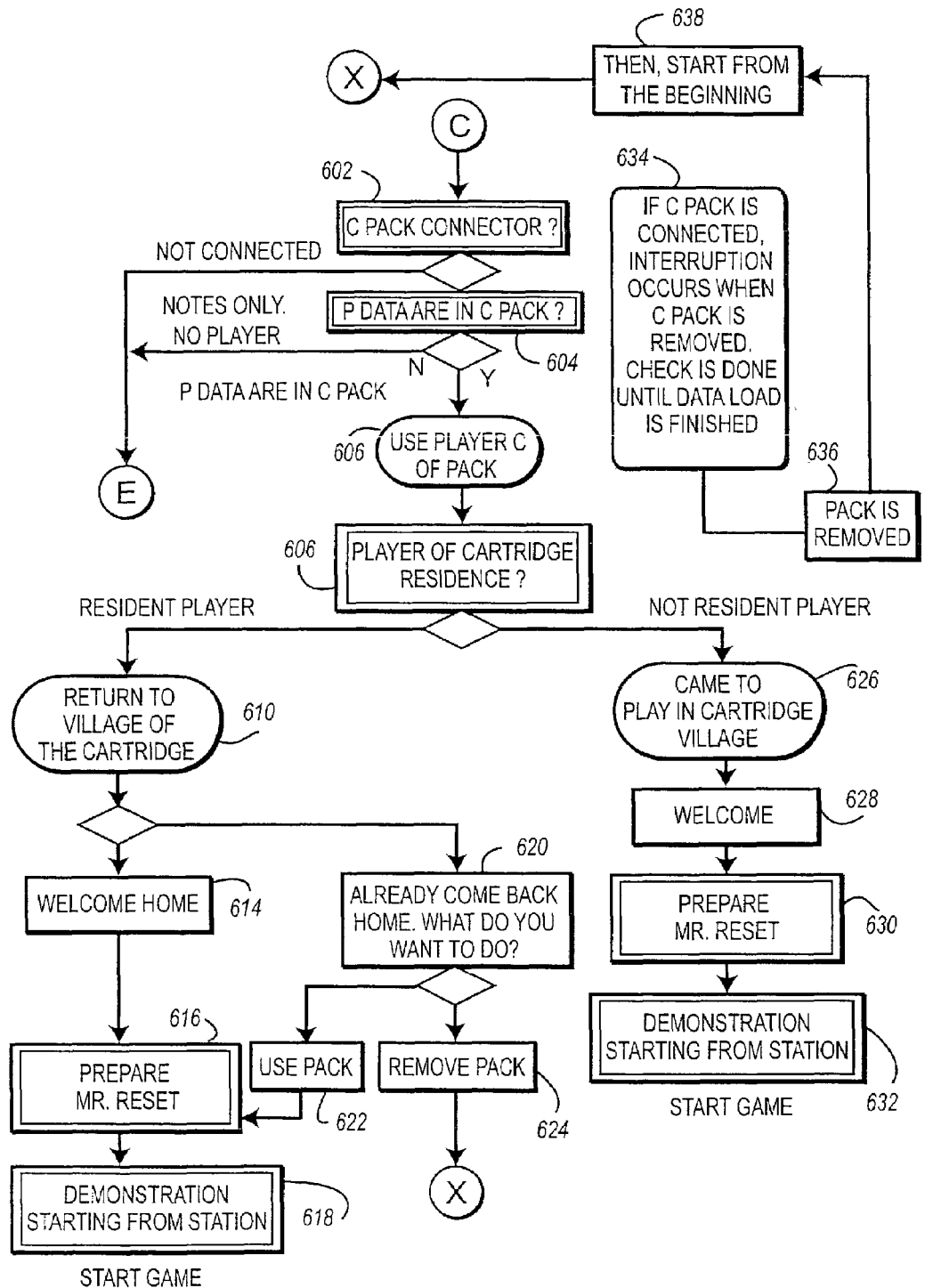

Referring to FIG. 15E, the routine next determines whether a portable memory M is connected to the home video game system 50 (block 602). If no portable memory M is connected, it is possible to proceed with game play using the permanently present memory FR, and the routine transfers control to the steps shown in FIG. 15F ("not connected" exit to block 602). Similarly, if a portable memory M is connected to home video game system 50 but there is no data stored in the portable memory, then game play proceeds using the permanently resident memory FR ("no" exit to block 604). On the other hand, if a portable memory M is inserted into the home video game system 50 and it contains player data ("yes" exit to decision block 604), then game play will proceed using the player character 206 stored within the portable memory M (block 606). In this instance, the routine determines whether the player character 206 is a resident of the virtual game environment 202 or is just a visitor (block 608). If a player character 206 is a resident ("resident player" exit of decision block 608), then this indicates that the player character previously traveled to another virtual game environment and is now returning to the current virtual game environment 202 (block 610). However, it is also possible that the player character 206 intended to leave to visit another virtual game environment 202 but has not yet done so. Decision block 612 performs this test. If the player character 206 has in fact visited another virtual game environment 202 (as indicated by data stored within the portable memory M), then the game routine welcomes the player character 206 home (block 614), prepares to reset the game by making the player character resident once again (block 616), and may perform a graphical sequence before restarting the game with the player resident (block 618). If the player character 206 has not yet visited another virtual game environment 202, the game routine prompts the use what he or she wants to do (block 620) and may proceed to either run the game without using the data stored in the temporary memory M or to run the game using the data stored in the temporary memory (blocks 622, 624).

In the case of when a player character 206 has left the virtual game environment 202 to visit another instance of the virtual game environment and then has returned home, exemplary embodiment permits different save options (e.g., when quitting the game, a save is possible both at home and at the railroad station simulation). When saving at home, the virtual game environment 202 and associated player character data 308 are updated and the player data within the portable memory M is then deleted. If the player character 206 is to remain at the railroad station construct rather than entering back into the virtual game environment 202, then the data within the permanent memory FR can be updated and the player character data 312 may then be copied into the portable memory M to thereby allow the player character 206 to make another journey.

In the case that the player character 206 present in a portable memory M is not a resident player ("not resident player" exit to block 608), this indicates that a player character has come to visit the virtual game environment instance 202 (block 626). In this case, the game routine displays a welcome message (block 628), and prepares to reset and start game play beginning from the railroad station construct through which the player character returns into the virtual game environment (blocks 630, 632).

As also shown in FIG. 15E, if the portable memory M is initially connected to the home video game platform 50 and then is removed during the middle of game play, game play halts until the portable memory device is inserted and read and write operations are completed (block 634). Once the portable memory M is then removed (block 636), game play can start from the beginning (block 638).

Figure 15F:
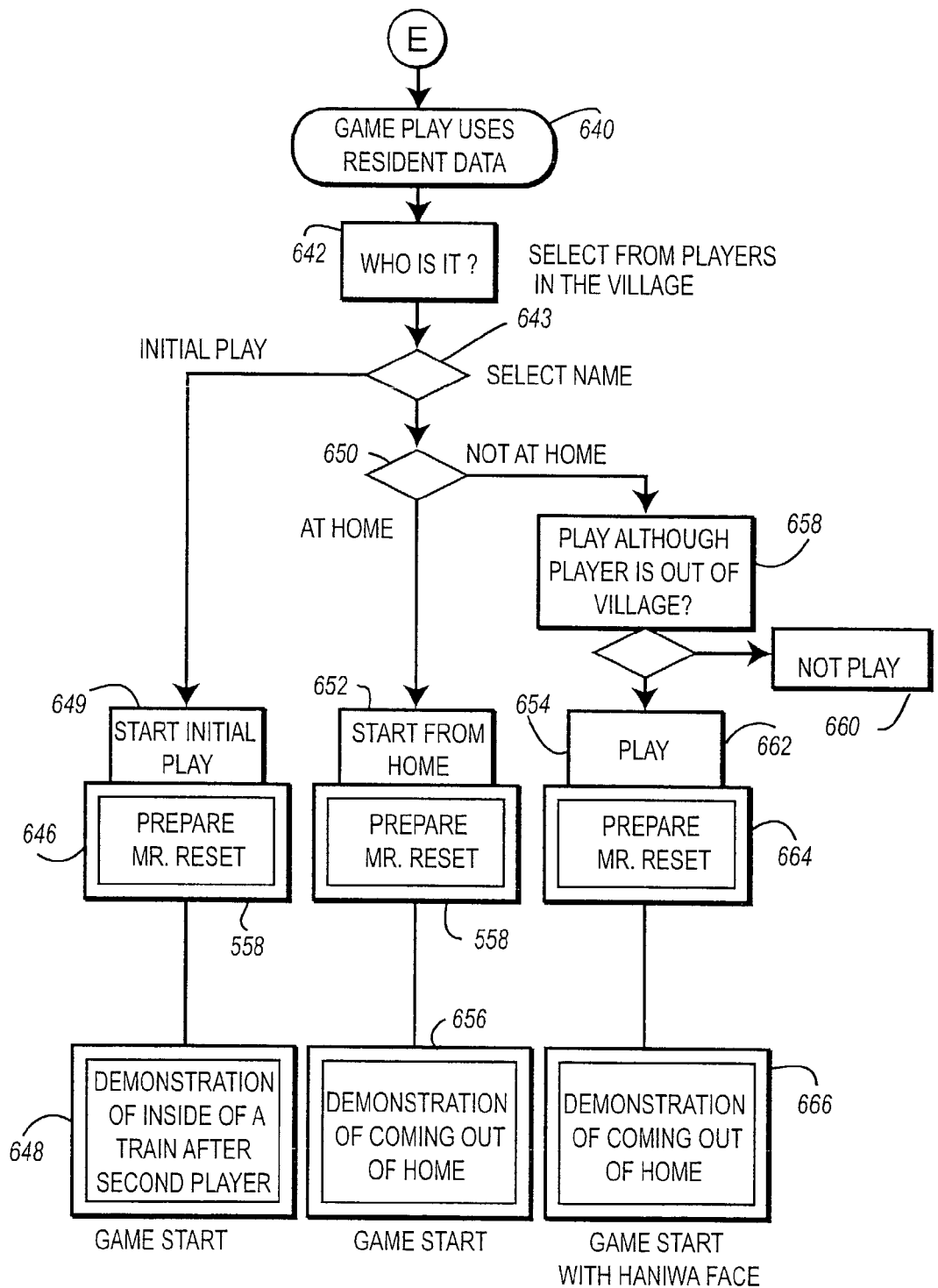

FIG. 15F shows a flowchart of exemplary steps used when there is no portable memory M connected to the home video game system 50 and/or the data within such a portable memory device is not to be used for the current game play session. Referring to FIG. 15F, in this mode of operation, the game play is based on data resident within the permanent resident memory FR and not within the portable memory M (block 640). In this case, the game routine asks the user to identify which of four possible player characters 204 are associated with the user (block 642). In the case of initial game play, an initial routine is run to allow a new player to be defined (blocks 644, 646, 648). If the specified player is not a new player character 206, then the game routine checks whether a specified player is at home or not at home (decision block 650). If the player character 206 is at home, the game may reset beginning at a "start from home" initialization point and the game play may proceed showing the player character 206 coming out of his dwelling 202 in the exemplary embodiment (blocks 652, 654, 656).

In the exemplary embodiment, if the player character 206 is not at home (i.e., he or she is out visiting another virtual game environment 202) ("not at home" exit to decision block 650), then the game routine asks the user whether he or she wishes to play even though his or her player is not at home (block 658). The user may choose to not play (block 660), or he or she may choose to play anyway (blocks 662, 664, 666).

In the case where the specified player is outside of the virtual game environments 202 and game proceeds, the exemplary embodiment removes all of the player's objects other than letters in order to provide copy protection.

As described above, a prepare to reset is performed at various points of the game routine (blocks 646, 654, 664). In such instances, exemplary embodiment embeds a random cryptogram into the associated player data. This random cryptogram data is then saved. By deleting stored cryptogram codes when the user quits the game in normal mode, irregular quitting can be detected. If the game routine detects that an irregular termination of the game has occurred, the game routine may display a message at the next game session start warning the user against irregular termination.

In the example embodiment, when a user plays the game beginning with the player character 204 associated with the user being at home (i.e., resident within the virtual game environment 202), there are two possible game termination conditions:

the player character 206 can remain at home at the conclusion of the game play session; or the player character 206 can leave the virtual game environment 202 in order to visit another virtual game environment instance.

In the example embodiment, when saving the player character within the current virtual game environment 202, the associated player data 308 is updated within the permanently associated memory FR and then the player data is deleted from the portable memory 312. On the other hand, when the player character 206 is to go on a visit to another virtual game environment instance 202, the permanent storage FR is updated and then the associated player character data 314 is copied into the portable memory M.

FIGS. 16A–16D are together a flowchart of exemplary program control steps performed by the preferred embodiment video game in the case that a player character 206 wishes to leave the virtual game environment 202. In the example embodiment, the player character 206 is queried by a non-player character 208 and asked whether the player character is a resident of the virtual game environment (i.e., village) (block 702). If the player character is a resident ("resident" exit to block 702), the player character 204 is prompted as to whether he or she intends to leave the virtual game environment (block 704). Similarly, if the player character 206 is a non-resident and approaches the railroad station or other entrance/exit to the virtual game environment 202, the player character 206 is prompted as to whether he or she wishes to return home to his own virtual game environment (block 706). In response to these prompts, if the player character is not going out or returning home, then play may continue and the conversation ends (block 708). Otherwise, this means that the player character 206 is either a resident who is leaving on a visit to another virtual game environment instance 202, or is a visiting player character who is leaving the virtual game environment instance 202 to return to his or home virtual game environment (blocks 710, 712). In either case, the exemplary embodiment game routine checks the data within the portable memory M (block 714) or at least attempts to do so. If there is no portable memory M attached (as tested for by decision block 716), then the user is prompted to insert a portable memory device so it can be used to store player data (block 718). If, on the other hand, the video game system 50 detects a technical error or it is unable to communicate with a portable memory M, the error routine shown in FIG. 16B may be performed to attempt to make a repair (see blocks 720–728). In the case that the portable memory M is different from the one that was initially connected to the home video game system 50 at the time that the game play was begun, the game routine in the exemplary embodiment requests the user to insert the same portable memory M as was previously inserted—thereby preventing copying and/or cloning of data (block 730). Other error conditions at this point include if there is already player character 206 data 312 in the portable memory M; if there is insufficient storage capacity in the portable memory device to insert additional data; and if the maximum number of data entries (e.g., mail messages or the like) have already been inserted into the portable memory device (see exit points 3, 4, 5 shown in FIG. 16A).

Figure 16A:
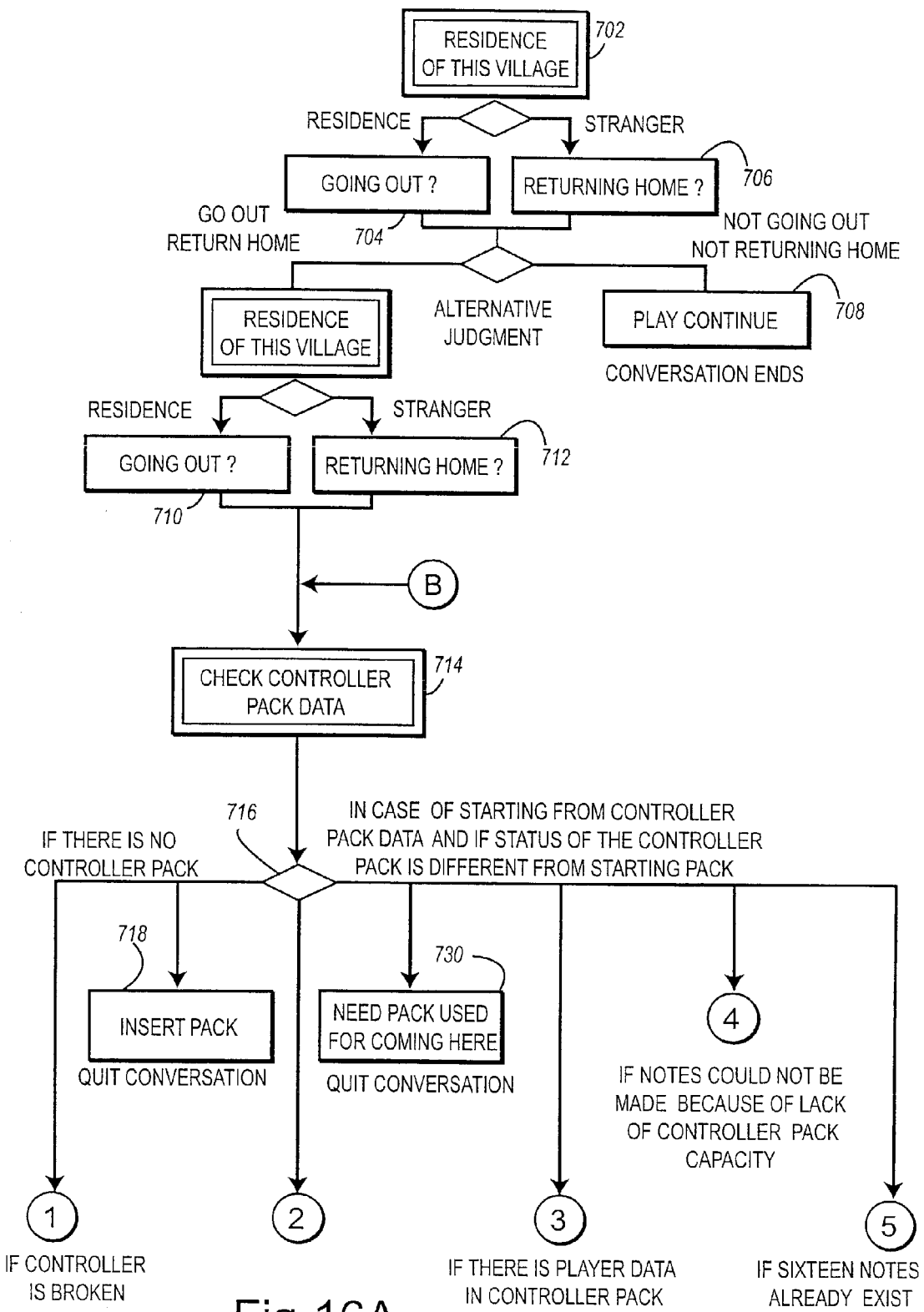
FIGS. 16A–16D show example game end/save routines.
Figure 16B:
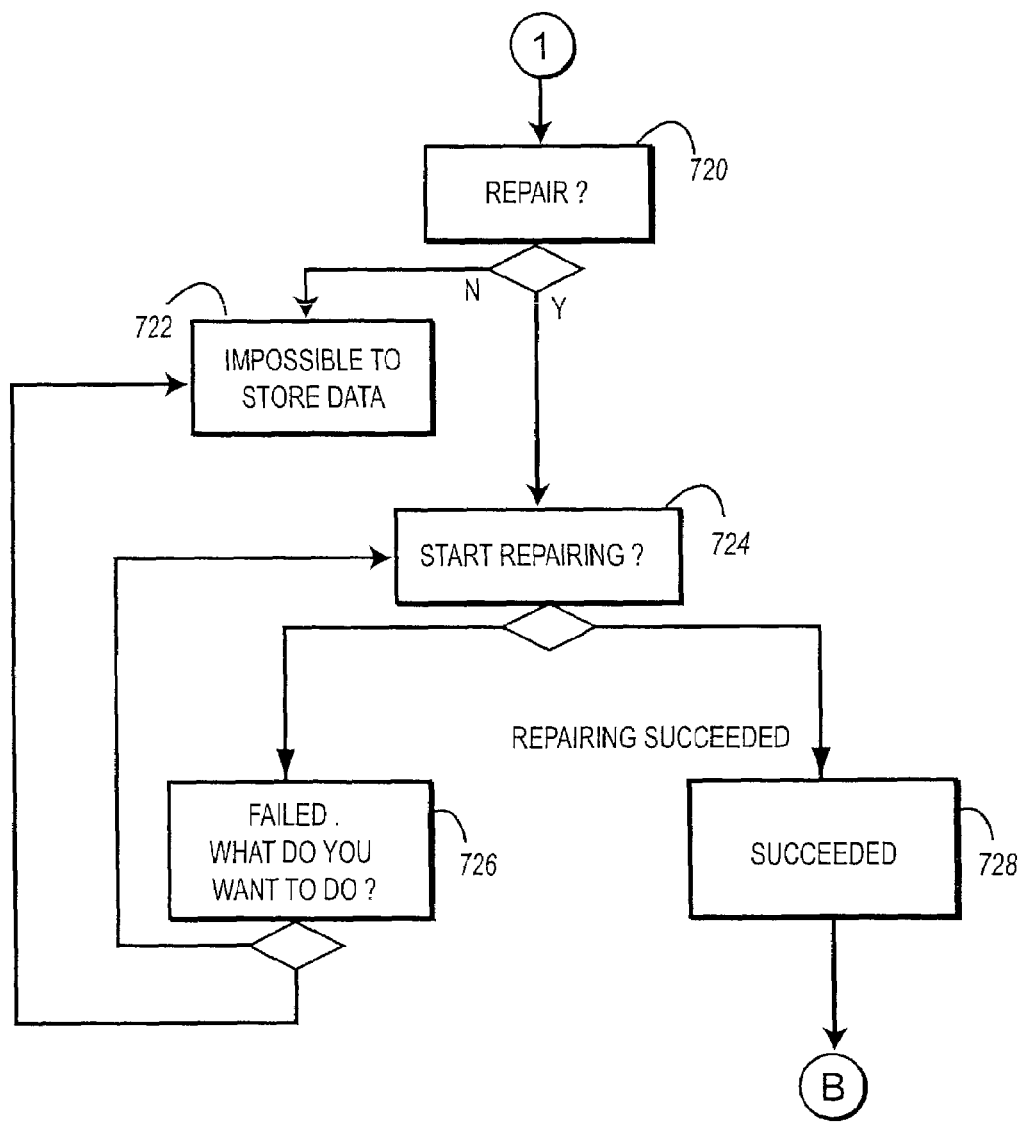
Figure 16C:
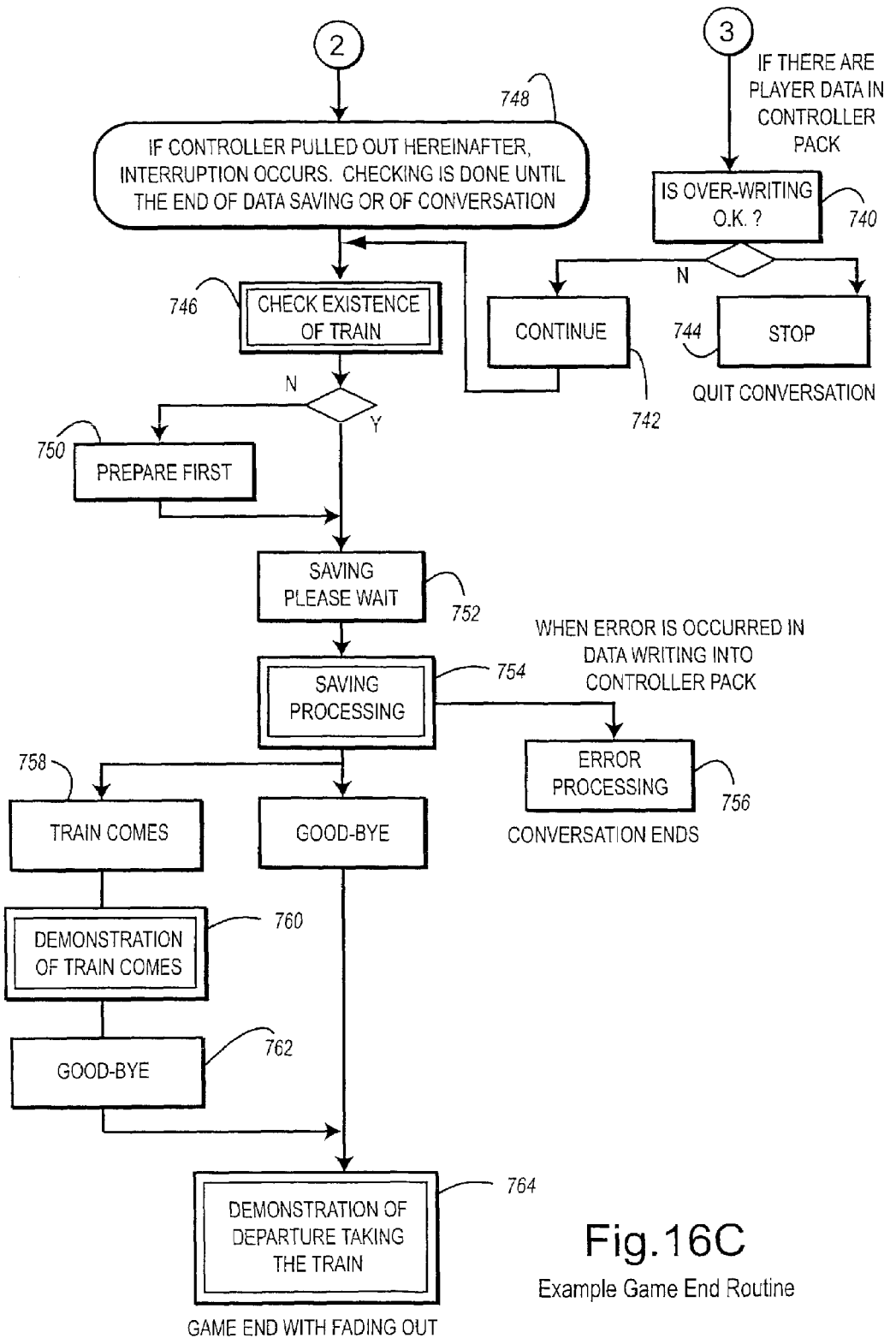
Figure 16D:
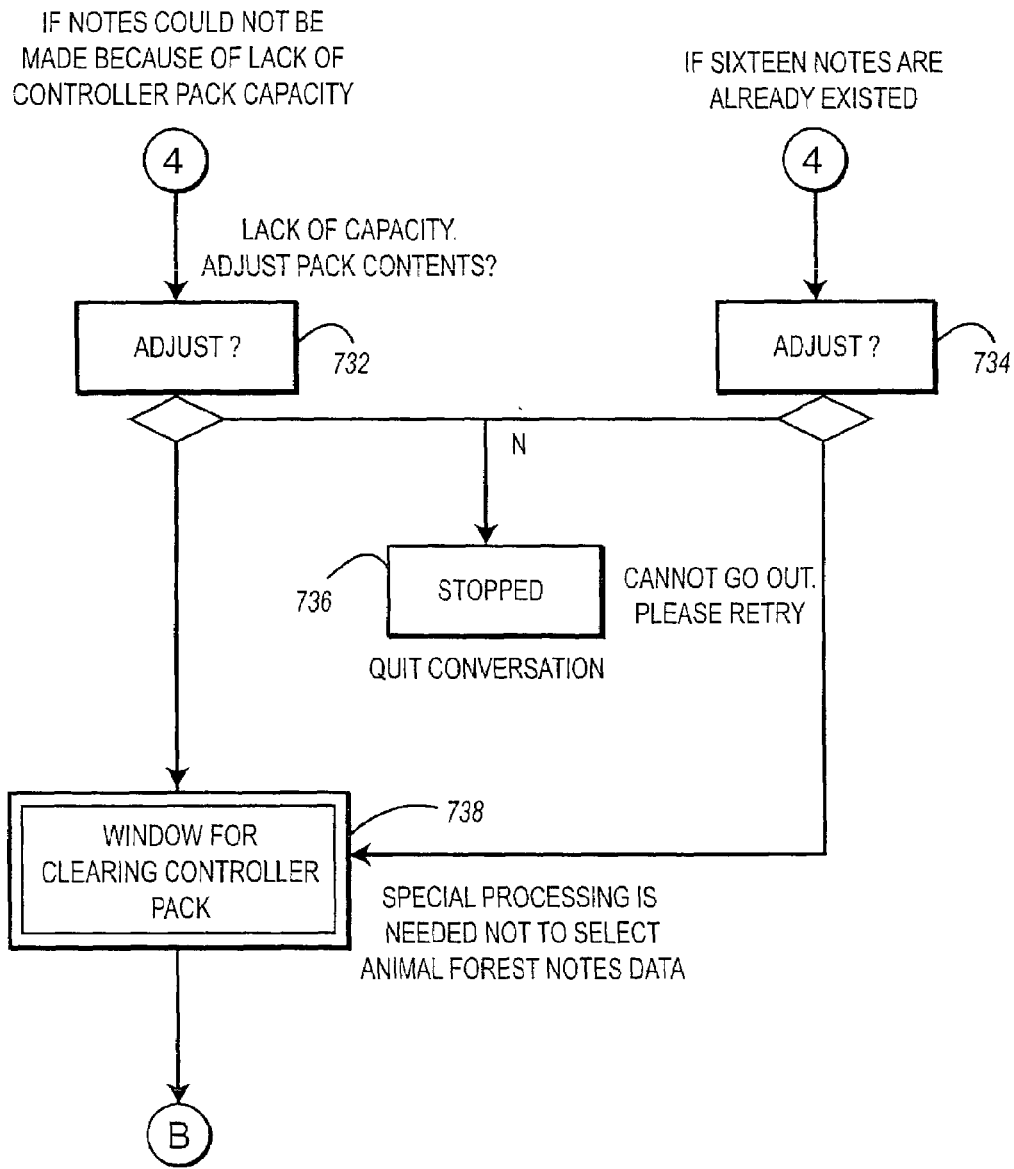

Referring to FIG. 16D, if additional data cannot be recorded because of a lack of storage capacity in the portable memory M or if maximum number of data entries have already been recorded into the portable memory device (entry points "4" and "5", respectively), then the user is asked whether he or she wants to adjust the contents of the portable memory M (blocks 732, 734). If there is not further capacity, then the save routine is stopped and the player character 206 is told that he cannot leave at this time (block 736). Otherwise, the user may be given the option to clean out some of the data within the portable memory M to provide room for the player character data (block 738).

Referring to FIG. 16C, the user may be prompted for permission as to whether or not to overwrite certain data within the portable memory M if there is other player data already in the portable memory device (blocks 740, 742, 744). Then (or if there is no error condition to begin with), the exemplary embodiment game end routine begins the process of saving pertinent data to the portable memory M beginning at block 746. During this save data process, if the portable memory M is removed from the home video game system 50 before data save has completed, the exemplary game end routine interrupts processing until the portable memory device has been reinserted (block 748). Such checking is performed continually in the exemplary embodiment until all data has been saved.

To begin the data save process, the exemplary game routine first checks whether a train construct has arrived at the station construct to provide a transport for the data (block 746). If not, then the game routine performs various preparation steps before saving any data (block 750). The exemplary game end routine then begins saving data (block 752) and associated processing (block 754). Data error writing conditions are checked and exception messages are generated in response (block 756). In the example embodiment, the exemplary game play routine then displays a train arriving at the station to pick up the passengers, and the game play then fades out as the train departs from the station to create an illusion that the player characters 206 are really going on a journey to another virtual game environment instance 202 (blocks 758, 760, 762, 764).

Figure 17A:
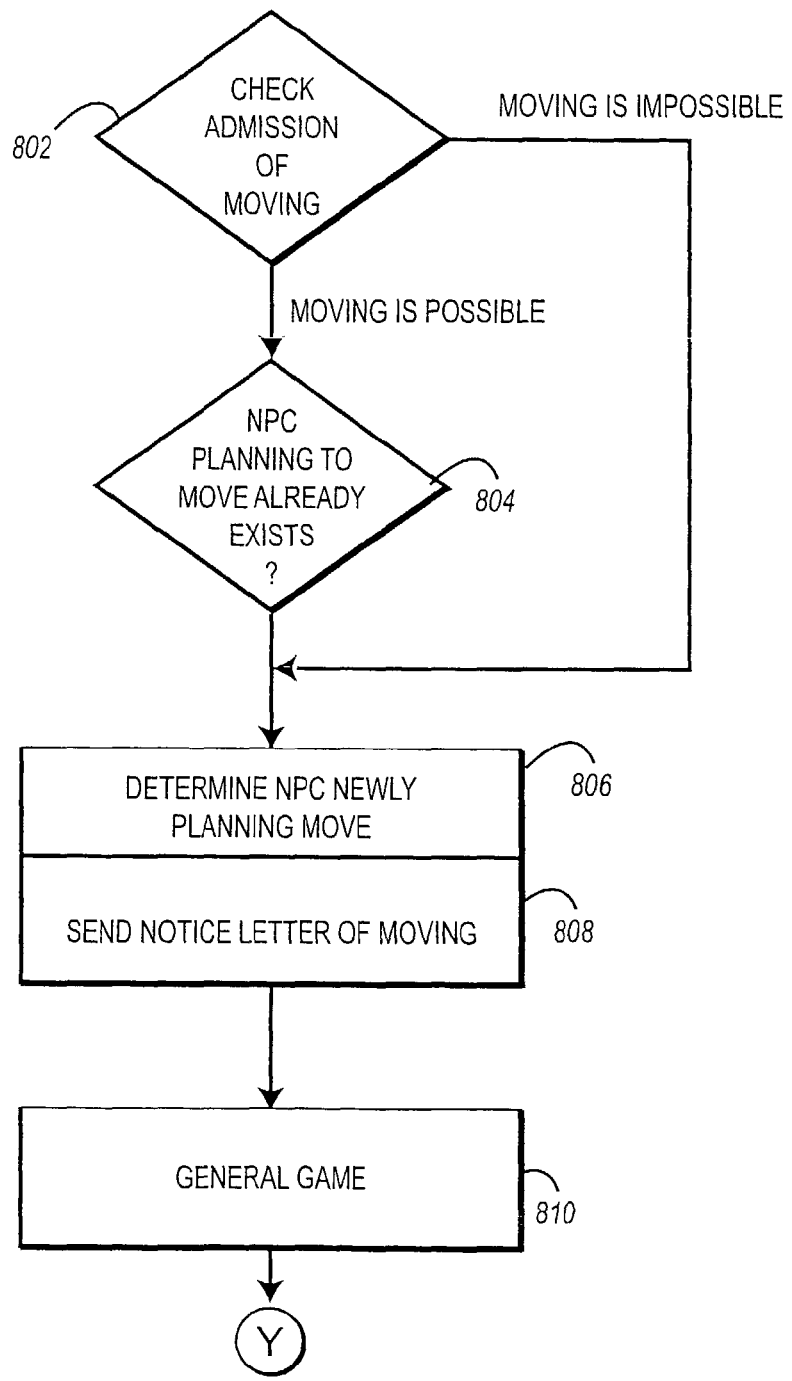
FIGS. 17A–17B show an example character moving game routine.
Figure 17B:
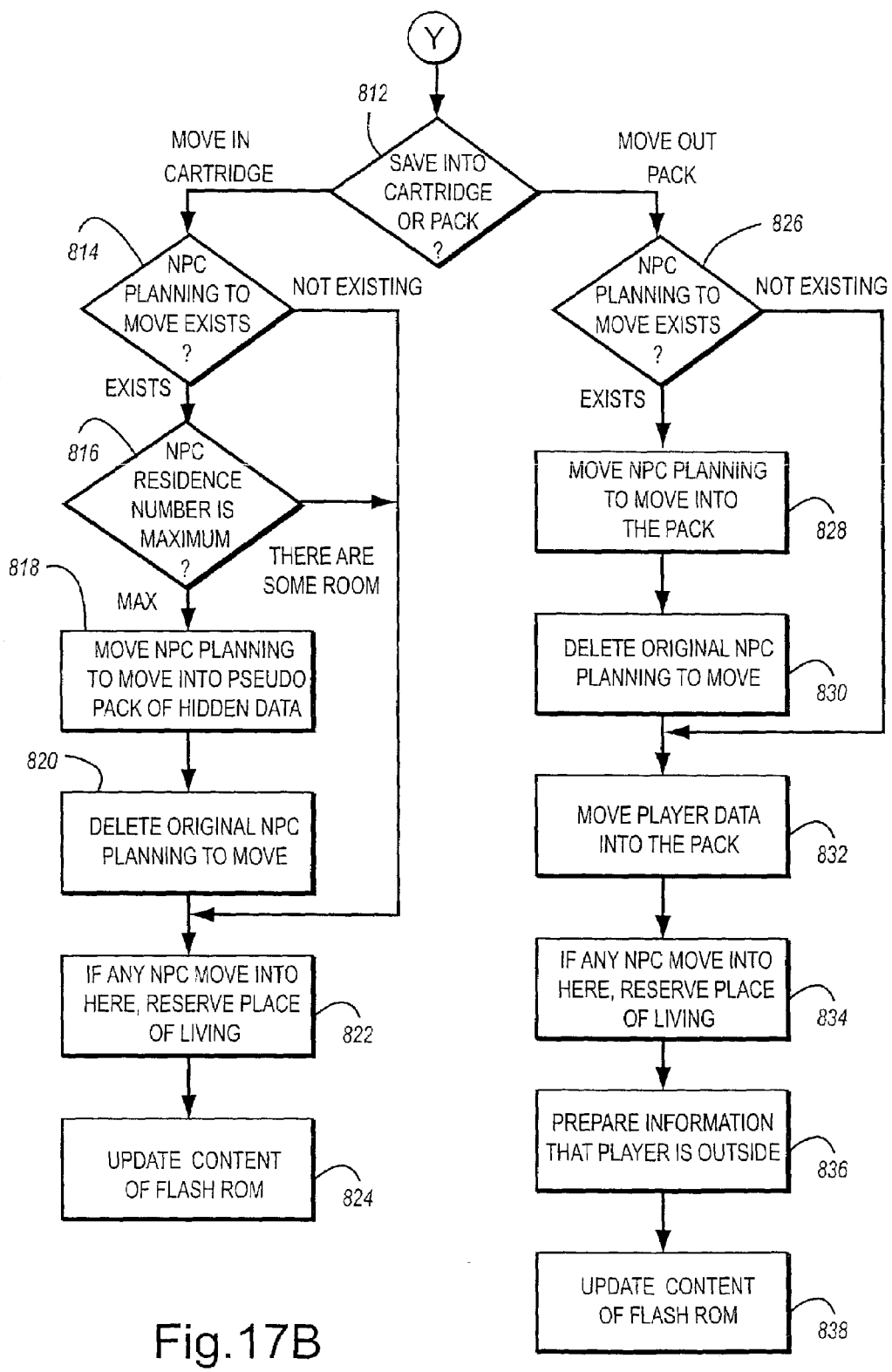

FIGS. 17A and 17B are together a flowchart of an exemplary routine used to allow non-player characters 208 to move from one virtual game environment instance 202 to another. In this example embodiment, the routine first checks whether moving is possible or not, as explained above (decision block 802). If moving is possible, then the exemplary routine determines whether the non-player character 208 that is planning to move should be permitted (block 804). For example, if the number of remaining non-player characters 208 is extremely small, it may be that no non-player character 208 will be permitted to leave—although additional non-player characters 208 may be accepted into the virtual game environment instance 202. Thus, in certain conditions, new non-player characters 208 can be accepted from other virtual game environment instances 202 without releasing current non-player characters 208 in return in the exemplary embodiment.

Assuming that the non-player character 208 will be permitted to leave the virtual game environment instance 202, the routine determines or selects which non-player character 208 should be selected to move (block 806), and then generates a notice letter informing the player characters 206 that this non-player character 208 is going to move (block 808). General game play then occurs (block 810). In the example embodiment, after the conclusion of general game play, a test is performed to determine whether to save the non-player character 208 associated data into the permanently-associated memory FR or into the portable memory M (i.e., whether the non-player character is to move into the current virtual game environment instance 202 or whether it is to move out of it) (decision block 812). If the non-player character 208 is moving into the current virtual game environment ("cartridge" exit to decision block 812), then the exemplary game routine tests whether the non-player character 208 planning to move already exists and whether the number of non-player characters already resident are at a maximum (decision blocks 814, 816). Failing either of these tests will prevent the non-player character 208 from becoming resident in the current virtual game environment instance 202. However, assuming there is sufficient room and the same non-player character 208 is not already resident, then blocks 818, 820 are preformed to move the non-player character planning to move into a hidden data area and deleting the original non-player character that was planning to move. Space is also reserved within the virtual environment 202 in which to place the new non-player character (block 822), and the contents of the permanently associated memory FR are updated accordingly (block 824).

In the case where the non-player character 208 is planning to move out of the current virtual game environment instance 202 ("move out" exit to decision block 812), the exemplary game routine performs a test to determine whether this non-player character 208 is already resident in the temporary memory M (decision block 826).

Assuming the test of decision block 826 passes, the exemplary game routine moves the non-player character 208 into the temporary memory M and deletes the corresponding entry from the permanently associated memory device FR (blocks 828, 830). In the example embodiment, additional player data may then be moved into the temporary memory M if desired (block 832), a place is reserved for an additional non-player character 208 that may wish to become resident in the virtual game environment instance 202 (block 834), the game routine prepares information indicating that the player data is a visitor (block 836), and then the contents of the permanently associated memory FR are updated appropriately (block 838).

Figure 18A:
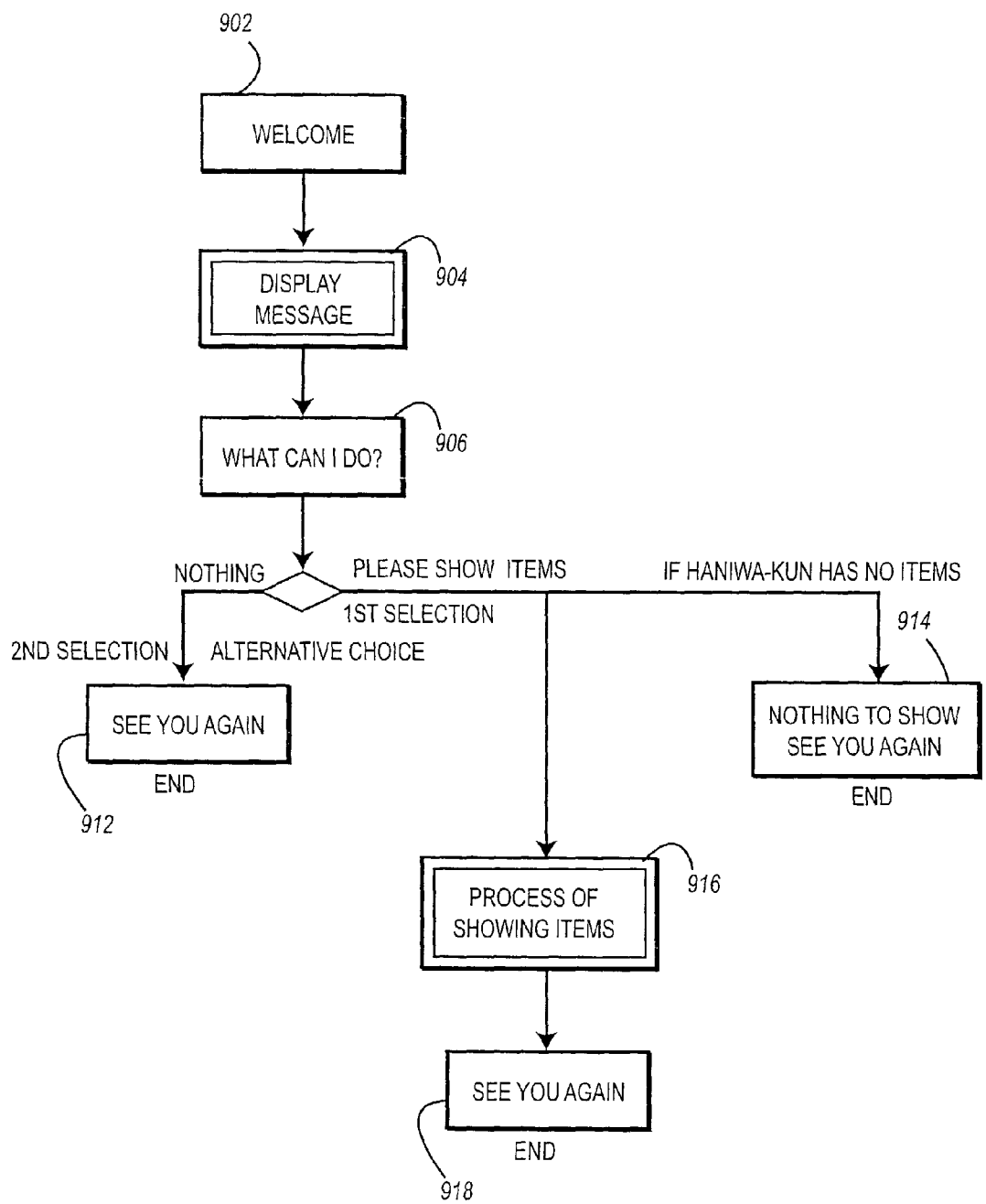
FIGS. 18A–18C show example home data save routines.
Figure 18B:
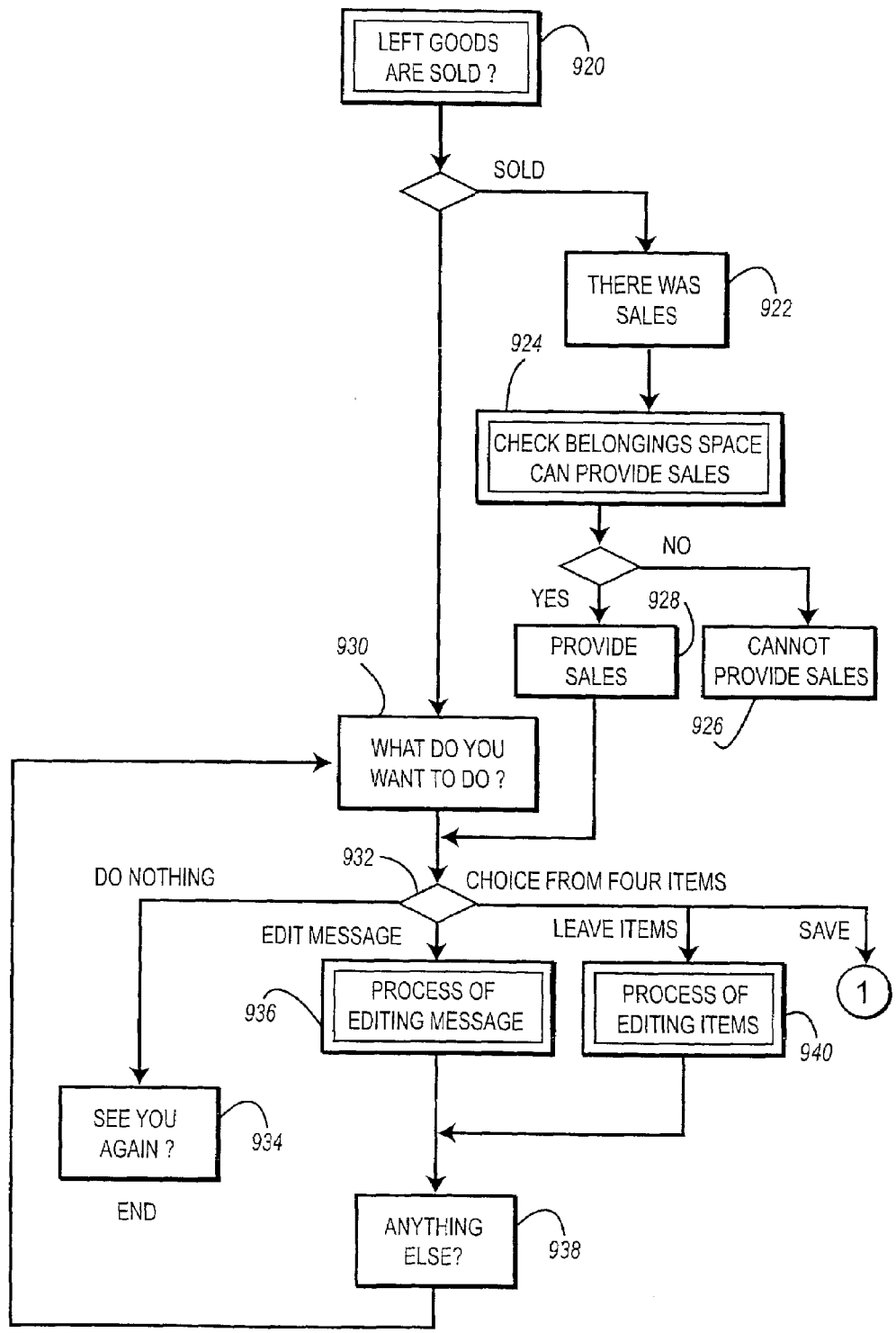
Figure 18C:
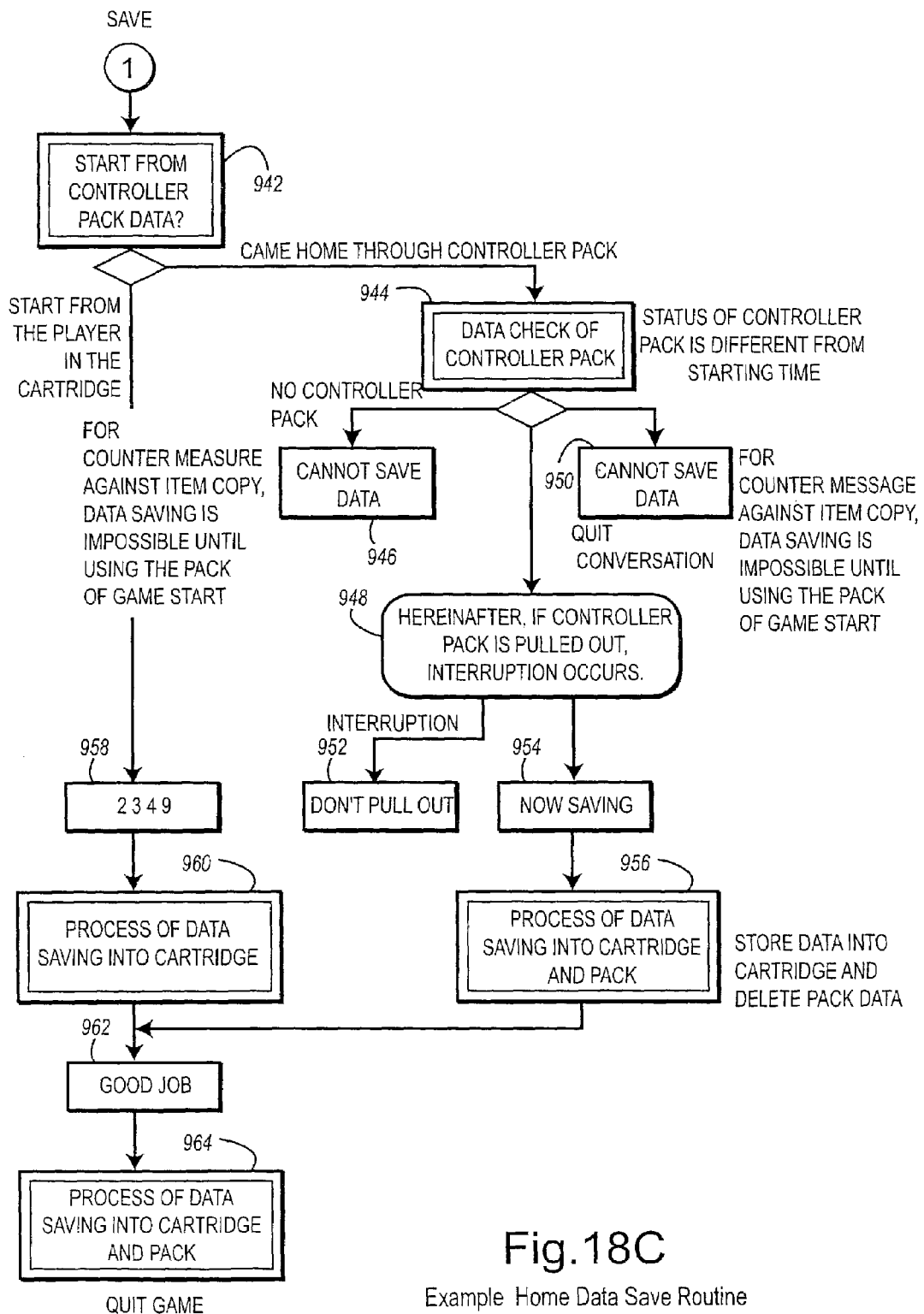

FIGS. 18A–18C are together a flowchart of an exemplary game routine used by player characters 206 to define a dwelling place 204. In the exemplary embodiment, a player character 206 finds and furnishes a dwelling place 204 by speaking to a particular "caretaker" character. In the exemplary embodiment, virtual game environment 202 includes several kinds of dwelling places 204 including vacant dwelling places and already occupied dwelling places. In the example embodiment, the caretaker welcomes the player character 206 (block 902) and then displays a message (block 904) asking the player character how the caretaker can help the player character (block 906). If the player character 206 responds that he or she does not need any help, the home occupying routine ends (decision block 910, block 912). Otherwise, the caretaker checks whether he or she has an inventory of any dwelling places 204 that are vacant—and will indicate that there is no vacant dwelling place available if there are no dwelling places left (block 914). Otherwise, the caretaker may proceed to show the player character 206 the various vacant dwelling places that are available so that the player character can choose one of the dwelling places if he or she so desires (blocks 916, 918).

FIG. 18B shows a routine that may be performed to purchase a dwelling place and to edit the items that are within the dwelling place 204—thereby allowing the user to customize a dwelling place or other environment for his or her player character 206. See blocks 920–940.

Referring to FIG. 18C, shown there is a flowchart of steps that may be used to store new dwelling place or other data into the permanently associated memory FR (see blocks 942–964).

EXAMPLE QUESTS

In one example illustrative embodiment of a role playing video game provided in accordance with this invention, player characters 206 may be assigned or can volunteer for quests to satisfy certain objectives. While quests are relatively common in adventure-type games, the communication and discrete different instances of the virtual game playing environment 202 provided by the preferred embodiment of this invention creates additional opportunities for quests. As one example, a player character 206 may undertake a quest to bring borrowed goods to a non-player character 208 that has moved to a different virtual game environment instance 202. For example, suppose that a player character 206 borrows or finds goods owned by a particular non-player character 208—and then, the non-player character moves to a different village or other virtual game environment instance 202 without bringing the goods along with it. In the example embodiment, a player character 206 may volunteer or undertake to bring such goods to the non-player character 208 who has subsequently moved to a different village. In this example embodiment, conditions involved in creating the quest include there being at least one space existing in the player's goods space 302 available, and that there be information stored within the home memory space FR indicating that a non-player character 208 has moved out. In that case, the player character 206 may be given a reward if he or she returns such goods to the non-player character 208. For example, when the quest is achieved, certain goods may be given to the player character 206, for example:

money (probability 40%),
carpets or other variety of goods available at a general store (probability 20%),
wallpaper (or other similar variety of goods available at the general store) (probability 20%),
furniture (or other similar variety of goods) (probability 20%), In order to prepare for the quest, the preferred embodiment game stores secretly the data of the recently moved out non-player character 208 into an appropriate space within the memory FR. Non-player character information 208 which should be stored may include necessary information for specifying the non-player character when delivering the goods to it (e.g., a name and native country of the non-player character plus for example a secret identifier). This information is updated whether or not the player character 206 was the character that brought the non-player character 208 to the other village. In the example embodiment, it is sufficient if there is only a single number of spaces available for storing this information.

Upon confirming that the non-player character 208 has moved out and that the information concerning the quest is correct, the exemplary game software determines the target non-player character. Then, the game in the exemplary embodiment randomly determines an object that will be said to have been left behind by the non-player character 208. This object may be specified in a table of borrowed objects, for example.

The game then, in the example embodiment, asks the player character 208 to deliver the object to the moved-out non-player character 208. In the example embodiment, the non-player character delivery information may be deleted upon completion of the quest in order to prevent overlapping quests from being created. If the player 206 succeeds in delivering the object to the non-player character, then the game gives money or other goods to the player character 206 as a reward.

In the example embodiment, the game software creates a table for the goods to be delivered in the quest. If a quest is created, then goods are randomly selected from that table and used. Such goods may include, for example, a guitar, a video, a picture book, a compact disk, a pocket Pikachu, a GAME BOY, glasses, a pocketbook, a clock, a comic book, or any other object. Different messages may be used to start the quest, to complete the quest, and to allow the player character 206 to give up on the quest without completing it.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method of providing interactive video game play comprising:
   (a) distributing a plurality of video game playing units to a corresponding plurality of video game players;
   (b) distributing software to said plurality of game players for use on said plurality of video game playing units, said software controlling each of said plurality of video game playing units to independently create a self-contained virtual gaming environment not requiring communication with a network to provide video game play therein, said plurality of independent virtual gaming environments being different from but compatible with one another;
   (c) encouraging said game players to interact with said virtual gaming environments by defining role playing characters residing within said respective virtual gaming environments; and
   (d) encouraging said game players to control said role playing characters to temporarily leave one of said virtual gaming environments provided by a first video game playing unit and to journey to another one of said virtual gaming environments provided by a further video game playing unit for a temporary visit; including:
   generating role playing character travel data,
   examining whether said role playing character is present at a predetermined position within said virtual gaming environment, and if said role playing character is present at said predetermined position, generating said role playing character travel data including non-player character data for exchange with another instance of said virtual gaming environment; and
   providing an intermittent communication path allowing said role playing character travel data to be communicated between said first and further game playing units thereby allowing at least one video game character to move between said first and further video game playing units.

2. The method of claim 1 further including providing portable writable memories for coupling to said video game play units, and encouraging said game players to use said portable writable memories to write said travel data onto said portable writable memories thereby permitting said role playing characters to travel between said plurality of virtual gaming environments.

3. The method of claim 1 wherein said software defines non-player characters within each of said virtual gaming environments, different non-player characters being at least initially defined within different ones of said virtual game environments, and said exchanged travel data includes data representing information concerning at least one non-player character to thereby control said non-player characters to move between said virtual gaming environments.

4. The method of claim 3 further including providing portable, writable memory devices for storing non-player character data, and encouraging said game players to temporarily couple said portable, writable memory devices to a plurality of said video game play units in succession in order to thereby write said travel data thereon and permit said non-player characters to move between said corresponding virtual gaming environments.

5. The method of claim 3 wherein said non-player characters move without any advanced knowledge to said game players, said method further including providing, to said game players, notices that said non-player characters have moved.

6. The method of claim 1 further including simulating a postal deliver service within said virtual gaming environments.

7. The method of claim 1 further including defining non-player characters within said virtual gaming environments, and encouraging said role player characters to virtually communicate, within said gaming environment, with said non-player characters.

8. The method of claim 7 wherein said communications comprises simulated written communications.

9. The method of claim 7 wherein said communications comprises simulated oral communications.

10. The method of claim 1 further including encouraging said game players to participate in virtual quests requiring them to control their role playing characters to visit other virtual gaming environments.

11. The method of claim 1 wherein each of said virtual gaming environments represents a sub-region of an overall region defined by said collection of virtual gaming environments.

12. The method of claim 1 further including distributing portable video game playing devices to said game players, and encouraging said game players to use said portable video game playing devices to transfer said role playing characters between said virtual gaming environments.

13. The method of claim 1 further including encouraging said game players to use a data communications network to exchange items between said virtual gaming environments.

14. The method of claim 1 further including synchronizing the simulated passage of time within said virtual gaming environments to real time.

15. A method of playing a video game comprising:
    establishing a virtual world using a first game playing device, said virtual world including at least one player character and at least one non-player character;
    allowing said player character to visit another virtual world, including generating travel data based at least in part on activities of said player character within a first virtual world, sending said travel data from the first game playing device to a further game playing device, and controlling said further game playing device to play a game including said visiting player character within a further virtual world provided by said further game playing device;
    wherein said travel data generating includes providing, within said travel data, information representing said at least one non-player character, said generated travel data controlling said at least one non-player character to change domicile from said first virtual world to said further virtual world.

16. The method of claim 15 wherein said step of controlling said further game playing device to play said game includes receiving and responding to interactive inputs from at least one human game player, and said generating includes not informing said human game player beforehand that said non-player character is changing its domicile to said other virtual world.

17. A method of coordinating game play between plural game playing devices comprising:
    manipulating an input control associated with a first game playing device to interactively display an animated player game character within a first virtual gaming environment;
    controlling said first game playing device to create travel data corresponding to said animated player game character,
    transferring said travel data from said first game playing device to a second game playing device different from said first game playing device, thereby allowing said animated player game character to temporarily visit a second virtual game environment provided by a second game playing device different from said first game playing device; and
    manipulating an input control associated with the second game playing device to interactively display said visiting animated player game character within said second virtual gaming environment,
    wherein said transferring further includes transferring at least one non-player animated character to change its domicile from said first virtual gaming environment to said second virtual gaming environment.

18. The method of claim 17 wherein said transferring includes simulating transport of said player game character via a simulated vehicle.

19. The method of claim 17 wherein said transferring includes writing said travel data onto a portable memory device coupled to said first game playing device, decoupling said portable memory device from said first game playing device, physically transporting said portable memory device to said second game playing device, and coupling said portable memory device to said second game playing device.

* * * * *